(12) United States Patent
Elden

(10) Patent No.: US 12,291,254 B2
(45) Date of Patent: May 6, 2025

(54) ADJUSTABLE HANDLES AS WELL AS ASSEMBLIES INCORPORATING THE SAME

(71) Applicant: dbest products, Inc., Carson, CA (US)

(72) Inventor: Richard Elden, Manhattan Beach, CA (US)

(73) Assignee: dbest products, Inc., Carson, CA (US)

( * ) Notice: Subject to any disclaimer, the term of this patent is extended or adjusted under 35 U.S.C. 154(b) by 0 days.

(21) Appl. No.: 18/620,371

(22) Filed: Mar. 28, 2024

(65) Prior Publication Data
US 2024/0239392 A1 Jul. 18, 2024

Related U.S. Application Data

(63) Continuation-in-part of application No. 18/402,768, filed on Jan. 3, 2024, and a continuation-in-part of application No. 18/542,495, filed on Dec. 15, 2023, which is a continuation of application No. 18/161,677, filed on Jan. 30, 2023, which is a continuation-in-part of application No. 17/712,032, filed on Apr. 1, 2022, now Pat. No. 11,565,735,
(Continued)

(51) Int. Cl.
*B62B 3/02* (2006.01)
(52) U.S. Cl.
CPC .................... *B62B 3/025* (2013.01)
(58) Field of Classification Search
CPC .......... B62B 3/025; B62B 9/20; A45C 13/26; A45C 13/262; A45C 2013/265; A45C 2013/267
See application file for complete search history.

(56) References Cited

U.S. PATENT DOCUMENTS 1,554,034 A 9/1925 Richie
2,132,069 A 10/1938 Hall
(Continued)

FOREIGN PATENT DOCUMENTS

CN 2460409 Y * 11/2001
CN 206813544 U 12/2017
(Continued)

OTHER PUBLICATIONS

Mechanical translation of CN-2460409-Y, Nov. 21, 2001.*
(Continued)

*Primary Examiner* — John D Walters
(74) *Attorney, Agent, or Firm* — ORBIT IP, LLP

(57) ABSTRACT

Adjustable handle assemblies as well as rolling assemblies incorporating the same are provided. The handle assemblies include a push button, a spring-loaded gear, a handle, and a base member, allowing for dynamic adjustment between released and locked positions. Actuation of the push button enables free rotation of the handle or secure locking at a predetermined angle, providing users with ergonomic comfort and stability during transportation. The rolling assembly further includes a robust frame structure, multiple wheel assemblies, and optional telescoping members, accommodating various transportation needs. Embodiments of the invention offer a comprehensive solution for urban commuters, travelers, and household users, combining ergonomic design, intuitive controls, and compact portability for seamless transportation of objects in diverse environments.

20 Claims, 20 Drawing Sheets

Related U.S. Application Data application No. 18/620,371 is a continuation of application No. 17/646,713, filed on Dec. 31, 2021, now Pat. No. 11,912,326, said application No. 17/712,032 is a continuation of application No. 17/143,116, filed on Jan. 6, 2021, now Pat. No. 11,338,835.

(60) Provisional application No. 63/584,236, filed on Sep. 21, 2023, provisional application No. 63/577,068, filed on Mar. 28, 2023, provisional application No. 63/576,750, filed on Mar. 6, 2023, provisional application No. 62/995,375, filed on Jan. 27, 2020, provisional application No. 62/974,956, filed on Jan. 6, 2020.

(56) References Cited

U.S. PATENT DOCUMENTS

| | | |
|---|---|---|
| 2,362,721 A | 11/1944 | Reynolds |
| 2,514,849 A | 7/1950 | Dewing |
| 2,564,939 A | 8/1951 | Weast |
| 2,715,533 A | 8/1955 | Strausburg |
| 2,742,973 A | 4/1956 | Johannesen |
| 2,757,935 A | 8/1956 | Sofia |
| 2,786,692 A | 3/1957 | Timpson |
| 2,957,700 A | 10/1960 | Beaurline |
| 3,041,026 A | 6/1962 | Wilson |
| 3,092,395 A | 6/1963 | Mitty et al. |
| 3,135,527 A | 6/1964 | Knapp |
| 3,276,786 A | 10/1966 | Olander |
| 3,804,432 A | 4/1974 | Lehrman |
| 4,202,521 A | 5/1980 | Harding |
| 4,509,461 A | 4/1985 | Peck |
| D292,135 S | 9/1987 | Grube et al. |
| 4,765,644 A | 8/1988 | Bell |
| 4,765,646 A | 8/1988 | Cheng |
| 4,852,520 A | 8/1989 | Goetz |
| 4,887,837 A | 12/1989 | Bonewicz, Jr. et al. |
| 4,977,857 A | 12/1990 | Slawinski |
| 5,168,601 A * | 12/1992 | Liu .......................... B62B 9/20 |
| | | 16/329 |
| 5,197,754 A | 3/1993 | Ward |
| 5,244,219 A | 9/1993 | Hadlum |
| 5,294,158 A | 3/1994 | Cheng |
| D352,145 S | 11/1994 | Perez |
| 5,603,573 A | 2/1997 | Mercier et al. |
| 5,653,194 A | 8/1997 | Guy |
| 5,660,476 A | 8/1997 | DeCoster |
| 5,678,842 A | 10/1997 | Hook et al. |
| 5,765,665 A | 6/1998 | Cheng et al. |
| 5,884,982 A | 3/1999 | Yemini |
| 5,988,671 A | 11/1999 | Abelbeck et al. |
| 6,021,740 A | 2/2000 | Martz |
| 6,076,485 A | 6/2000 | Peeples et al. |
| 6,126,183 A | 10/2000 | Lensing |
| 6,431,580 B1 | 8/2002 | Kady |
| 6,561,524 B1 | 5/2003 | Medina |
| 6,598,898 B2 | 7/2003 | Chu |
| D477,916 S | 8/2003 | Nykoluk |
| 6,601,859 B2 | 8/2003 | Durham |
| 6,626,634 B2 | 9/2003 | Hwang et al. |
| 6,651,791 B1 | 11/2003 | Nykoluk et al. |
| 6,688,516 B1 | 2/2004 | Ussen |
| 6,918,474 B2 | 7/2005 | Nykoluk |
| 7,066,476 B2 | 6/2006 | Elden |
| D525,758 S | 7/2006 | Lynch |
| 7,140,635 B2 | 11/2006 | Johnson et al. |
| 7,147,243 B2 | 12/2006 | Kady |
| D545,025 S | 6/2007 | Elden |
| 7,270,223 B2 * | 9/2007 | Miller .................. A45C 13/262 |
| | | 16/113.1 |
| 7,316,407 B1 | 1/2008 | Elden |
| D565,269 S | 3/2008 | Tomasiak et al. |
| 7,458,451 B2 | 12/2008 | Godshaw et al. |
| 7,600,618 B2 * | 10/2009 | Fenton ................. A45C 13/262 |
| | | 16/113.1 |
| 7,617,797 B2 | 11/2009 | Lam |
| 7,631,575 B2 * | 12/2009 | Gard ....................... F16C 11/10 |
| | | 74/530 |
| 7,731,221 B2 | 6/2010 | Bess |
| 7,766,367 B2 * | 8/2010 | Dotsey ...................... B62B 9/26 |
| | | 280/658 |
| 7,789,044 B2 | 9/2010 | McGrade |
| 7,914,015 B2 | 3/2011 | Tompkins |
| D642,764 S | 8/2011 | Elden |
| 8,317,219 B2 | 11/2012 | Bruce |
| 8,366,124 B1 | 2/2013 | Caldwell |
| 8,439,374 B1 | 5/2013 | Elden |
| D690,893 S | 10/2013 | O'Brien |
| 8,579,305 B2 | 11/2013 | Hou |
| 8,641,059 B2 | 2/2014 | Khodor et al. |
| 8,915,504 B1 | 12/2014 | Seibert |
| D723,237 S | 2/2015 | Maddux et al. |
| 9,233,700 B1 | 1/2016 | Elden |
| 9,382,035 B2 | 7/2016 | Fritz |
| 9,392,766 B1 | 7/2016 | Elden |
| 10,588,388 B2 | 3/2020 | Kabalin |
| 10,676,235 B1 | 6/2020 | Song et al. |
| D904,716 S | 12/2020 | Shen |
| D930,314 S | 9/2021 | Huang |
| D932,186 S | 10/2021 | Brunner et al. |
| D942,107 S | 1/2022 | Ren |
| 2002/0050429 A1 | 5/2002 | Nykoluk et al. |
| 2002/0089134 A1 | 7/2002 | Salzberger et al. |
| 2002/0139628 A1 | 10/2002 | Chang |
| 2002/0144874 A1 | 10/2002 | Nykoluk et al. |
| 2003/0011173 A1 | 1/2003 | Shall |
| 2004/0075248 A1 | 4/2004 | Elden |
| 2004/0211635 A1 | 10/2004 | Lu |
| 2005/0275195 A1 | 12/2005 | Matula et al. |
| 2006/0278173 A1 | 12/2006 | Kamijo |
| 2007/0215425 A1 | 9/2007 | Slater |
| 2009/0145913 A1 | 6/2009 | Panosian et al. |
| 2009/0205578 A1 | 8/2009 | Alves |
| 2009/0212536 A1 | 8/2009 | Tadeo |
| 2010/0026080 A1 | 2/2010 | Colchiesqui |
| 2010/0175633 A1 | 7/2010 | Krauss et al. |
| 2011/0056441 A1 | 3/2011 | Chang |
| 2011/0197823 A1 | 8/2011 | Pietra |
| 2012/0055122 A1 | 3/2012 | Beauchamp |
| 2012/0274052 A1 | 11/2012 | Zhu |
| 2013/0320641 A1 | 12/2013 | Zhang |
| 2015/0360710 A1 | 12/2015 | Thompson |
| 2017/0001654 A1 | 1/2017 | Obrien |
| 2017/0120679 A1 | 5/2017 | Naiva |
| 2017/0297601 A1 | 10/2017 | Carbonaro |
| 2018/0014502 A1 | 1/2018 | O'Shaughnessy et al. |
| 2019/0216193 A1 | 7/2019 | Kabalin |
| 2019/0322302 A1 | 10/2019 | Greenup |
| 2020/0269898 A1 | 8/2020 | Frankel et al. |

FOREIGN PATENT DOCUMENTS

| | | |
|---|---|---|
| CN | 107668883 A | 2/2018 |
| CN | 207120985 U | 3/2018 |
| CN | 207191693 U | 4/2018 |
| CN | 207506081 U | 6/2018 |
| CN | 108328065 A | 7/2018 |
| CN | 208070260 U | 11/2018 |
| CN | 304926177 S | 12/2018 |
| CN | 305015819 S | 1/2019 |
| CN | 209177176 U | 7/2019 |
| CN | 210747711 U | 6/2020 |
| CN | 214777508 U | 11/2021 |
| DE | 202020102798 U1 | 5/2020 |
| EP | 3318465 A1 | 5/2018 |

(56) References Cited

FOREIGN PATENT DOCUMENTS

GB        2243198 A     10/1991
GB        2349186 A     10/2000

OTHER PUBLICATIONS

Amazon.com, "Foldable Utility Cart Portable Rolling Crate Handcart Shopping Trolley Collapsible 4 Rotate Wheels with Durable Heavy Duty Plastic Telescoping Handle for Travel Shopping Moving Storage Office Use", Available online at: "https://www.amazon.com/Portable-Handcart-Telescoping-Collapsible-Shopping/dp/B08HT17X39?th=1", Retrieved on Sep. 6, 2023, 8 pages.

Amazon.com, Foldable Utility Cart Folding Portable Rolling Crate Handcart with Durable Heavy Duty Plastic Telescoping Handle Collapsible 4 Rotate Wheels for Travel Shopping Moving Luggage Office Use (Red), Available online at: "https://www.amazon.com/Foldable-Portable-Handcart-Telescoping-Collapsible/dp/B07YFG4BW6/ref=sr_1_1?dchild=1&keywords=B07YFG4BW6&qid=1627442148&sr=8-1&th=1" Retrieved on Sep. 6, 2023, 9 pages.

Amazon.com, "Olympia Tools 85-015 Grand Folding Storage Rolling Cart with Telescopic Handle for Easy Transportation, Weight Capacity up to 150 Pounds", Available online at : "https://www.amazon.ca/Pack-N-Roll-85-015-917-85-015-Portable-Capacity/dp/B076D9XG7T?th=1", Retrieved on Sep. 6, 2023, 7 pages.

Amazon.com, "Olympia Tool 85-010 Grand Pack-N-Roll Portable Tool Carrier, Black" Available online at: "https://web.archive.org/web/20150727103951/http://www.amazon.com:80/Olympia-85-010-Pack-N-Roll-Portable-Carrier/dp/B000UZOP7I", Retrieved on Sep. 6, 2023, 5 pages.

Bed Bath and Beyond. com, "Folding Crate Cart in Grey", 2022, 9 pages.

Ebay.com, "Dbest Products Quik Cart Elite Stair Climber wheeled rolling crate", May 31, 2022, 4 pages, https://www.ebay.com/itm/394062298897.

Global Industrial, "Olympia Tools Grand Pack-N-Roll® Rolling Folding Crate Cart 85-010-80 Lb. Capacity", Available online at: "https://www.globalindustrial.com/p/pack-n-roll-grand-rolling-folding-crate-cart-85-010", Retrieved on Sep. 6, 2023, 3 pages.

\* cited by examiner

ADJUSTABLE HANDLES AS WELL AS ASSEMBLIES INCORPORATING THE SAME

RELATED APPLICATIONS

This application is a continuation-in-part of U.S. patent application Ser. No. 18/542,495, filed on Dec. 15, 2023, which is: (i) a continuation of U.S. patent application Ser. No. 18/161,677, filed on Jan. 30, 2023, which is a continuation-in-part of U.S. patent application Ser. No. 17/712,032, filed on Apr. 1, 2022, and issued as U.S. Pat. No. 11,338,835, which is a continuation of U.S. patent application Ser. No. 17/143,116, filed on Jan. 6, 2021, and issued as U.S. Pat. No. 11,565,735, which claims the benefit of the filing date of U.S. Provisional Patent Application, Ser. No. 62/974,956, filed on Jan. 6, 2020, and U.S. Provisional Patent Application, Ser. No. 62/995,375, filed on Jan. 27, 2020, the disclosure of each is incorporated herein by reference in its entirety; and (ii) claims the benefit of U.S. Provisional Patent Application, Ser. No. 63/576,750, filed on Mar. 6, 2023, the disclosure of which is incorporated herein by reference in its entirety. This application also claims the benefit of U.S. Provisional Patent Application, Ser. No. 63/577,068, filed on Mar. 28, 2023, the disclosure of which is incorporated herein by reference in its entirety.

This application is also a continuation-in-part of U.S. patent application Ser. No. 18/402,768, filed on Jan. 3, 2024, which is a continuation of U.S. patent application Ser. No. 17/646,713, filed on Dec. 31, 2021, and issued as U.S. Pat. No. 11,912,326, the disclosure of each is incorporated herein by reference in its entirety.

This application also claims the benefit of U.S. Provisional Patent Application, Ser. No. 63/584,236, filed on Sep. 21, 2023, the disclosure of which is incorporated herein by reference in its entirety.

FIELD OF THE INVENTION

This patent document relates to adjustable handles, and more particularly, to adjustable handles for rolling assemblies incorporating the same.

DESCRIPTION OF THE RELATED ART

Collapsible carts, baby strollers, and various other rolling assemblies have long been used in household and commercial settings, offering convenient means for transporting goods and/or children. These rolling assemblies typically feature fixed, sturdy handles that facilitate pushing or pulling.

Despite their widespread use, the design of traditional rolling assemblies has seen minimal evolution over time. A significant limitation of existing designs lies in the fixed nature of their handles, which restricts the adaptability and ergonomic comfort for users. Fixed handles often fail to accommodate variations in user preferences or physical requirements, leading to potential discomfort or inefficiency during use.

Prior art rolling assemblies have not adequately addressed the need for adjustable handles to enhance user experience. The absence of adjustable handles in traditional designs has resulted in a persistent gap in functionality and usability.

Recognizing the shortcomings of the prior art, there exists a clear demand for innovations that offer enhanced versatility and ergonomic adaptability in rolling assemblies. The present disclosure aims to fulfill this need by introducing improved adjustable handles and rolling assemblies that offer a dynamic range of motion while ensuring secure locking at desired positions. By providing users with greater control over handle orientation, these innovations seek to optimize comfort, convenience, and usability in various transportation scenarios.

Thus, the existing landscape of rolling assemblies lacks adequate solutions for adjustable handles. The present disclosure addresses this deficiency by introducing novel mechanisms that enable seamless rotation and secure locking of handles, thereby enhancing the overall functionality and user experience of rolling assemblies.

SUMMARY

Adjustable handle assemblies as well as rolling assemblies incorporating the same are disclosed herein. Embodiments of the present disclosure may include rolling assemblies configured to transition from a closed condition where it may be folded up to an open condition where it may be expanded for use. The rolling assembly may include a frame, a plurality of wheel assemblies and a handle assembly. The frame may be configured to transport one or more objects. The plurality of wheel assemblies may be rotatably coupled to the frame, and each of the plurality of wheel assemblies including a wheel.

In one embodiment, the handle assembly includes a push button, a spring-loaded gear, a handle, and a base member. The push button may define a push-button axis and include at least one push-button arm. The spring-loaded gear may include a gear shaft and a plurality of gear teeth. The spring-loaded gear may be adapted to actuate between a released position and a locked position. The handle may include an arm extending substantially perpendicular to a handle shaft. The handle shaft may include a first compartment and a second compartment separated by a retaining or housing wall with one or more apertures. The first compartment and the second compartment may be aligned along the push-button axis.

In some embodiment, the first compartment may be adapted to slidably receive the push button. The second compartment may include a gear hub with a plurality of shaft teeth formed on a surface thereof and radially disposed about the push-button axis. The gear hub may be configured to receive the spring-loaded gear and interlock the plurality of shaft teeth with the plurality of gear teeth. In one embodiment, the gear hub may be positioned adjacent the retaining or housing wall and in a distal end of the handle shaft. The second compartment may also be adapted to rotatably receive the base member at the proximate end of the handle shaft.

In some embodiments, the base member may be coupled to the frame and includes a base gear hub with a plurality of base-member teeth formed on a surface thereof and radially disposed about the push-button axis. The base gear hub may be configured to receive the spring-loaded gear and interlock the plurality of base-member teeth with the plurality of gear teeth.

As can be appreciated, in the released position, the handle assembly may be configured to allow rotation of the handle upon actuation of the push button, which may move the at least one push-button arm through one of the one or more apertures of the retaining wall, and in turn, may slidably disengage the spring-loaded gear from the gear hub to allow the arm to freely rotate along the push-button axis. Meanwhile, in the locked position, the handle assembly may be configured to prevent rotation of the handle upon release of the push button, which may slidably interlock the spring-loaded gear to the gear hub.

Embodiments of the present disclosure may include collapsible carts, baby strollers, hand trucks, and various other rolling assemblies. In one embodiment, the rolling assembly may include a child seat or bed assembly mounted to the frame. In another embodiment, the rolling assembly may include a toe plate coupled to the frame. The toe plate may be rotatably coupled to the frame, and substantially aligned with an exterior surface of at least one wheel. In yet another embodiment, the frame forms a compartment having a front wall, a rear wall, a right sidewall, a left sidewall, and a bottom wall, the right sidewall and the left sidewall are configured to fold inwardly in a closed condition. The frame may include an integrated lock assembly having a first condition for locking the frame in the open condition, and a second condition for unlocking the frame to allow folding for the closed condition. In another embodiment, the rolling assembly may include a telescoping member having a proximate end and a distal end, the telescoping member may be coupled to the frame at the distal end and may be coupled to the handle assembly at the proximate end. In yet another embodiment, the rolling assembly may include a flexible bag having four vertical walls and an openable top, which collectively form a chamber for placing objects, wherein the bottom wall of the flexible bag rests on a horizontal base section of the frame.

In another embodiment of the present disclosure, a rolling assembly is configured to transition from a closed condition where it is folded up to an open condition where it is expanded for use. The rolling assembly may include a frame, a plurality of wheel assemblies and a handle assembly. The frame may be configured to transport one or more objects and forming a compartment having a front wall, a rear wall, a right sidewall, a left sidewall, and a bottom wall. The plurality of wheel assemblies may be rotatably coupled to the frame, each of the plurality of wheel assemblies comprising a wheel.

The handle assembly may include a push button, a guide pin, a spring-loaded gear, a handle, and a base member. The push button may define a push-button axis and may include a button cap and at least one push-button arm. The at least one push-button arm may be located beneath the button cap and configured to actuate the spring-loaded gear. Meanwhile, the spring-loaded gear may include a gear shaft and a plurality of gear teeth, and may be adapted to actuate between a released condition and a locked condition.

In some embodiments, the handle may include an arm extending substantially perpendicular to a handle shaft. The handle shaft may include a first compartment and a second compartment separated by a housing wall with one or more apertures, and aligned along the push-button axis. The first compartment may be adapted to slidably receive the button cap as the at least one push-button arm traverses through the at least one or more aperture of the housing wall. The second compartment may include a handle gear hub at a distal end with a plurality of shaft teeth formed on a surface thereof and radially disposed about the push-button axis. The handle gear hub may be configured to receive the spring-loaded gear and removably engage the plurality of shaft teeth with the plurality of gear teeth. In one embodiment, the second compartment may be adapted to rotatably receive the base member at the proximate end of the second compartment.

In some embodiments, the base member may be coupled to the frame and include a base gear hub with a plurality of base-member teeth formed on a surface thereof and radially disposed about the push-button axis. The base gear hub may be substantially the same dimensions as the handle gear hub and may be configured to receive the spring-loaded gear and removably engage the plurality of base-member teeth with the plurality of gear teeth.

As can be appreciated by a person of ordinary skill, in the released condition, the handle assembly may be configured to allow rotation of the handle upon actuation of the push button, moving the at least one push-button arm through one of the one or more apertures of the housing wall, and in turn, slidably moving the spring-loaded gear to the base gear hub to allow the arm to freely rotate along the push-button axis. Further, in the locked condition, the handle assembly may be configured to prevent rotation of the handle upon release of the push button, slidably moving the spring-loaded gear to a predetermined position where a first section of the gear teeth at its distal end interlocks with the shaft teeth of the handle gear hub and a second section of the gear teeth at its proximate end interlocks with the base-member teeth of the base gear hub.

In some embodiments, the rolling assembly may include a telescoping member coupled to the frame at a distal end and coupled to the handle assembly at a proximate end. Further, the at least one of the plurality of wheel assemblies may include a brake assembly with a brake lever arm. In yet another embodiment, the right sidewall and the left sidewall of the frame may be configured to fold inwardly in the closed condition. The right sidewall may include a first right panel rotatably coupled to a second right panel, and the left sidewall may include a first left panel rotatably coupled to a second left panel.

In yet another embodiment, the rolling assembly may further include a first track formed along the first right panel and the second right panel extending from a first position on the first right panel to a second position on the second right panel. The rolling assembly may also include a first slideable member cooperatively engaged to the first track, and movable along the first track between an open position to a closed position to selectively lock the first right panel to the second right panel.

In another embodiment of the present disclosure, a rolling assembly includes a frame, a plurality of wheel assemblies, and a handle assembly. The frame may include a frame bottom wall and configured to transport one or more objects. The plurality of wheel assemblies may be rotatably coupled to the frame, and each of the plurality of wheel assemblies comprising a wheel.

The handle assembly may include a push button, a spring-loaded gear, a handle, and a base member. The push button may define a push-button axis and include a button cap with at least one push-button arm located beneath the button cap and configured to actuate the spring-loaded gear. The spring-loaded gear may include a gear shaft and a plurality of gear teeth. The spring-loaded gear may be adapted to actuate between a released position and a locked position.

The handle may include an arm extending substantially perpendicular to a handle shaft. The handle shaft may include a first compartment and a second compartment separated by a housing wall with one or more apertures. The first compartment may be adapted to slidably receive the button cap button as the at least one push-button arm traverses through the at least one or more apertures of the housing wall. Meanwhile, the second compartment may include a handle gear hub at a distal end with a plurality of shaft teeth formed on a surface thereof and radially disposed about the push-button axis. The handle gear hub may be configured to receive the spring-loaded gear and removably engage the plurality of shaft teeth with the plurality of gear teeth. Further, the second compartment may be adapted to rotatably receive the base member at a proximate end of the second compartment. As can be appreciated, the base member may be coupled to the frame and include a base gear hub with a plurality of base-member teeth formed on a surface thereof and radially disposed about the push-button axis. The base gear hub may be substantially the same dimensions as the handle gear hub and configured to receive the spring-loaded gear and removably engage the plurality of base-member teeth with the plurality of gear teeth.

In some embodiments, in the released position, the handle assembly may be configured to allow rotation of the handle upon actuation of the push button, moving the at least one push-button arm through one of the one or more apertures of the housing wall, and slidably moving the spring-loaded gear to the base gear hub to allow the arm to freely rotate along the push-button axis. Further, in the locked position, the handle assembly may be configured to prevent rotation of the handle upon release of the push button, slidably moving the spring-loaded gear to a predetermined position where a first section of the gear teeth at its distal end interlocks with the shaft teeth of the handle gear hub and a second section of the gear teeth at its proximate end interlocks with the base-member teeth of the base gear hub.

In one embodiment, the rolling assembly has a frame forming a compartment with a front wall, a rear wall, a right sidewall, a left sidewall, and the frame bottom wall. The right sidewall and the left sidewall may be configured to fold inwardly in a closed condition. In another embodiment, the rolling assembly may include a telescoping member coupled to the frame at the distal end and coupled to the handle assembly at the proximate end. In yet another embodiment, the rolling assembly includes a flexible bag having four vertical walls, a bottom wall, and an openable top, which collectively form a chamber for placing objects, and wherein the bottom wall of the flexible bag rests on a frame bottom wall of the frame. Furthermore, the flexible bag may include one or more buckles to couple the flexible bag to the frame.

Each of the foregoing various aspects, together with those set forth in the claims and described in connection with the embodiments summarized above and disclosed herein may be combined to form claims for a device, apparatus, system, methods of manufacture and/or use in any way disclosed herein without limitation.

BRIEF DESCRIPTION OF THE DRAWINGS

These and other features, aspects and advantages are described below with reference to the drawings, which are intended to illustrate but not to limit the invention. In the drawings, like reference characters denote corresponding features consistently throughout similar embodiments.

DETAILED DESCRIPTION

Figure 1:
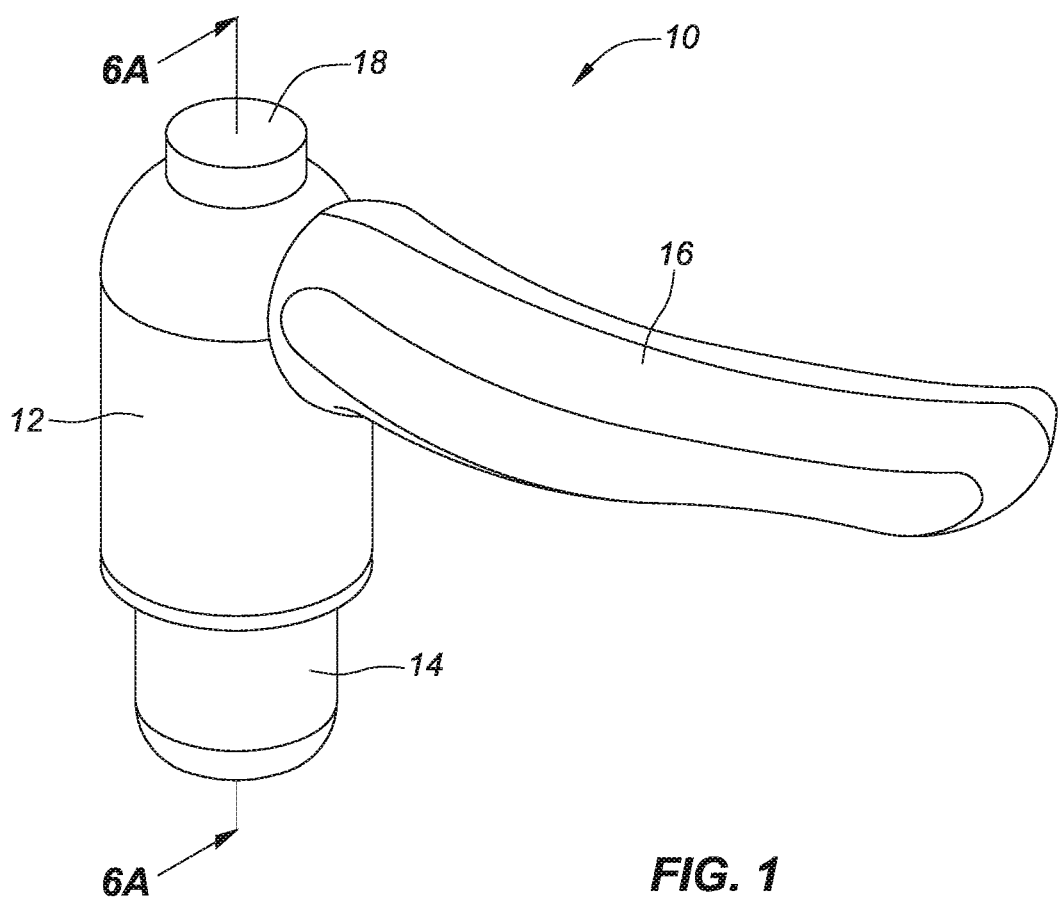
FIG. 1 is a perspective view of a handle assembly, according to an embodiment.
Figure 2:
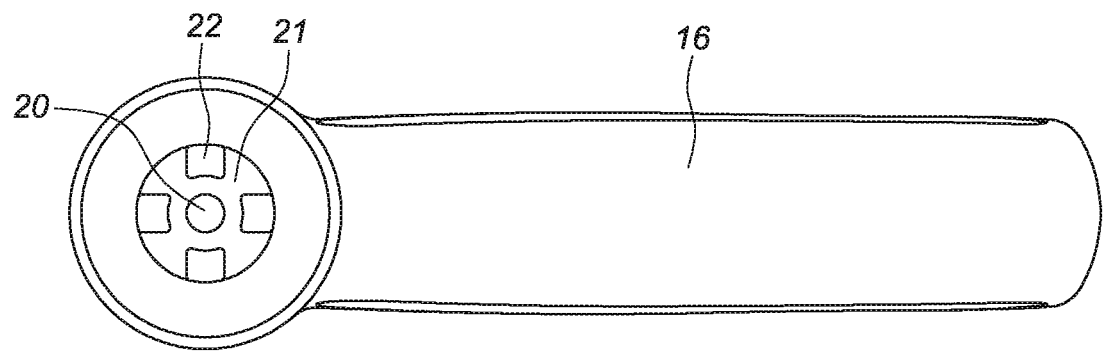
FIG. 2 is a top view of a handle from FIG. 1, according to an embodiment.
Figure 3:
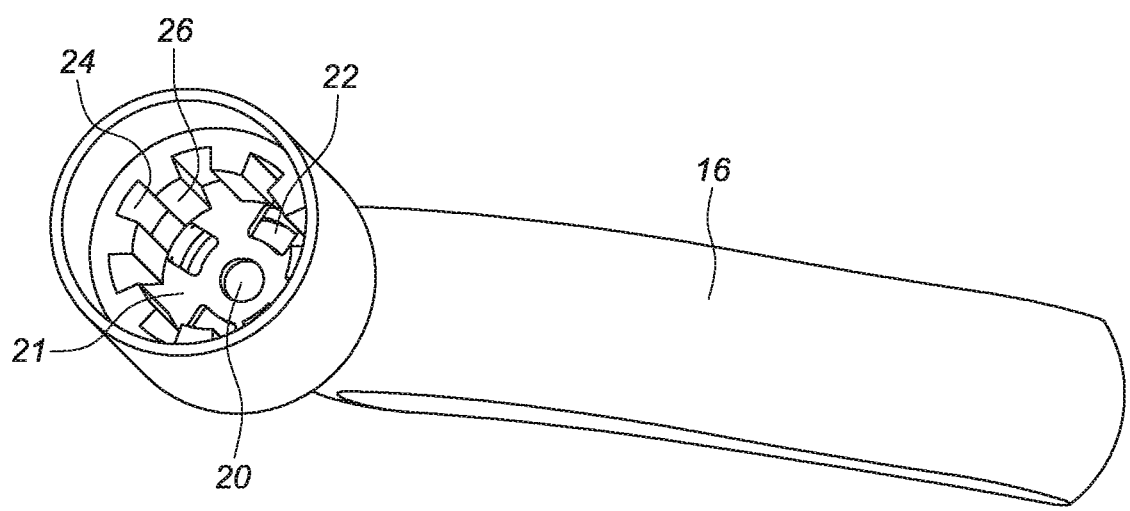
FIG. 3 is a bottom view of the handle from FIG. 1, according to an embodiment.

Unique and inventive rolling assemblies are disclosed herein. Although embodiments of rolling assemblies are disclosed herein, it is to be expressly understood that the present invention is not restricted solely to such embodiments. Rather, the present disclosure is directed to each of the inventive features described below, both individually as well as collectively, in various embodiments. Further, as will become apparent to those skilled in the art, one or more aspects of the present disclosure may be incorporated in other devices.

FIGS. 1-7 illustrate a handle assembly 10, according to an embodiment of the present disclosure. In some embodiments, the handle assembly 10 may include a push button 18, a spring-loaded gear 28, a pin 32, a handle 13, and a base member 14. The spring-loaded gear 28 may include a gear shaft 29 and a plurality of gear teeth 30. The spring-loaded gear 28 may be adapted to actuate between a released position or condition and a locked position condition via a spring 34.

Figure 4:
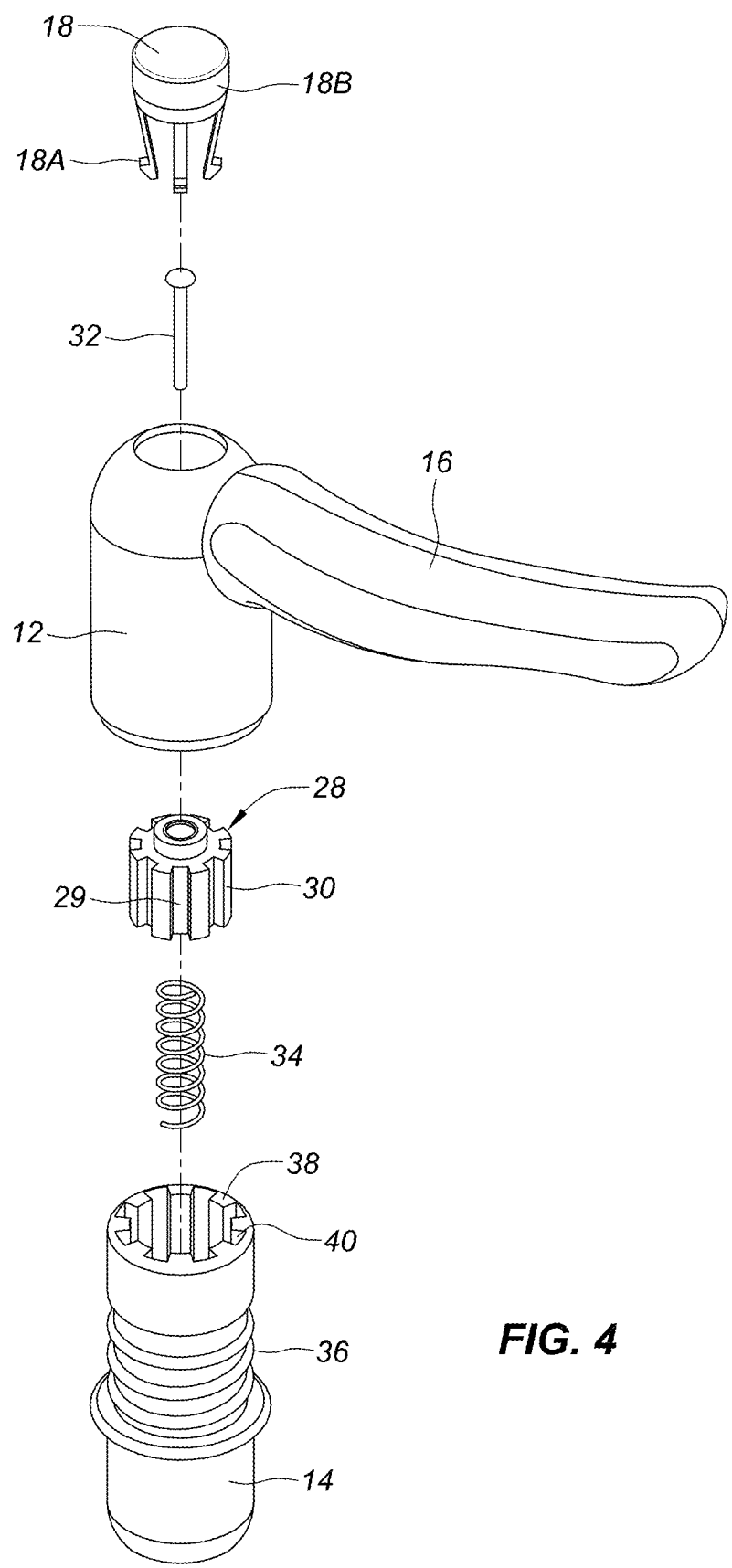
FIG. 4 is an exploded perspective view of the handle assembly of FIG. 1, according to an embodiment.
Figure 5:
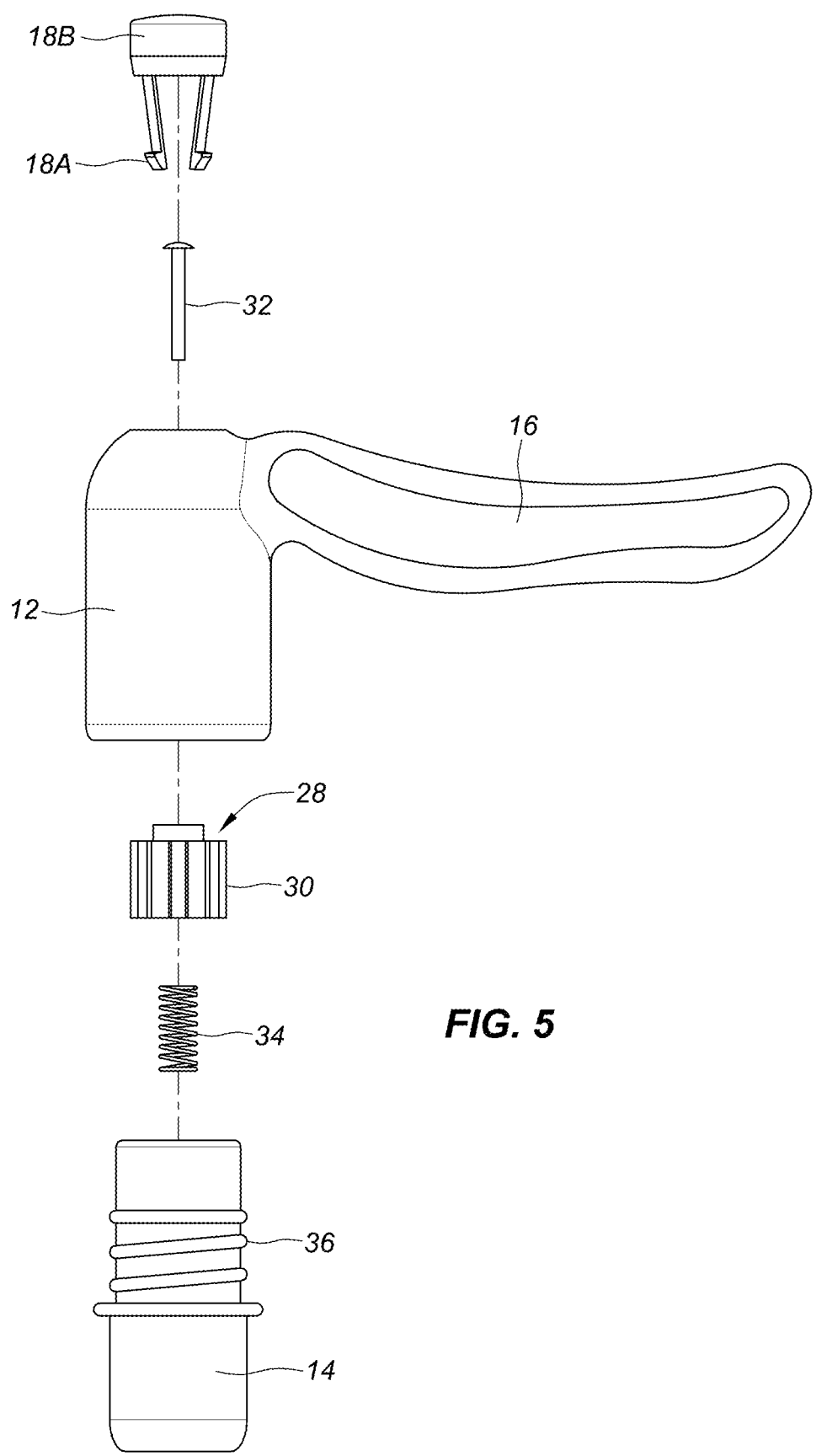
FIG. 5 is an exploded side view of the handle assembly of FIG. 1, according to an embodiment.
Figure 6A:
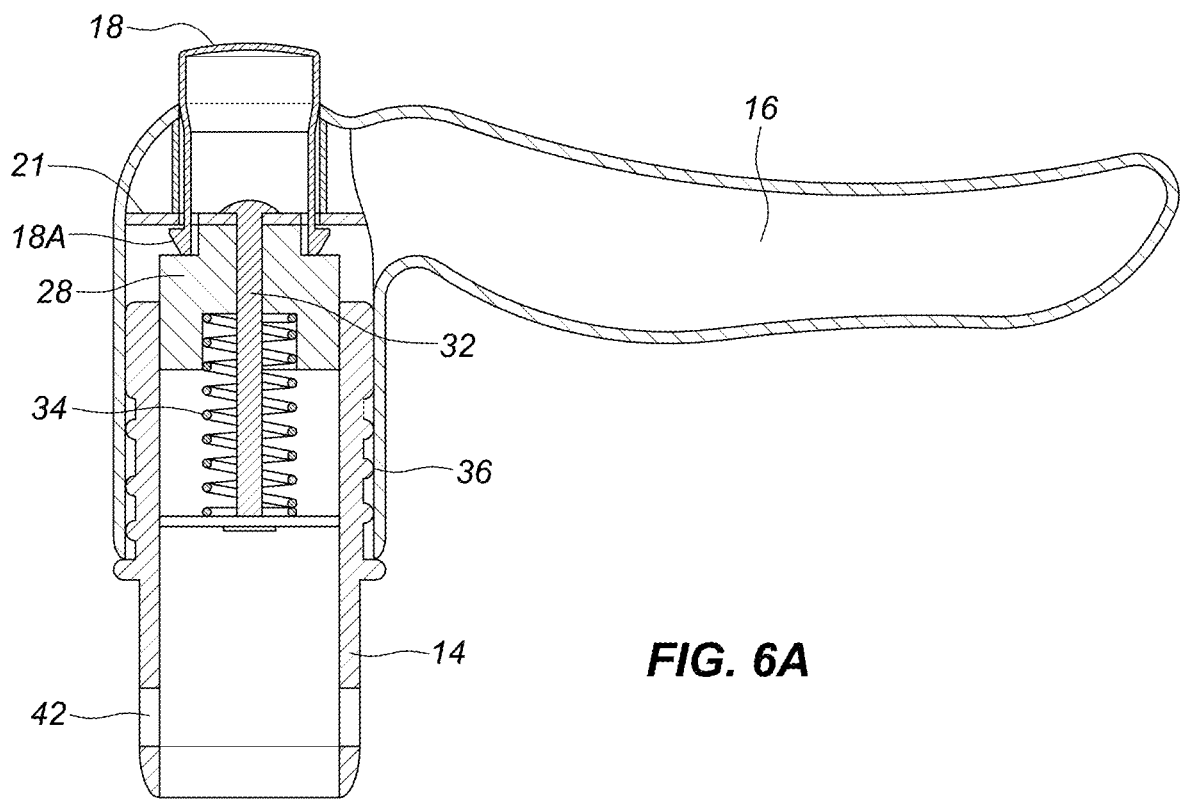
FIG. 6A is cross-sectional view of the handle assembly of FIG. 1 in a released condition, according to an embodiment.
Figure 6B:
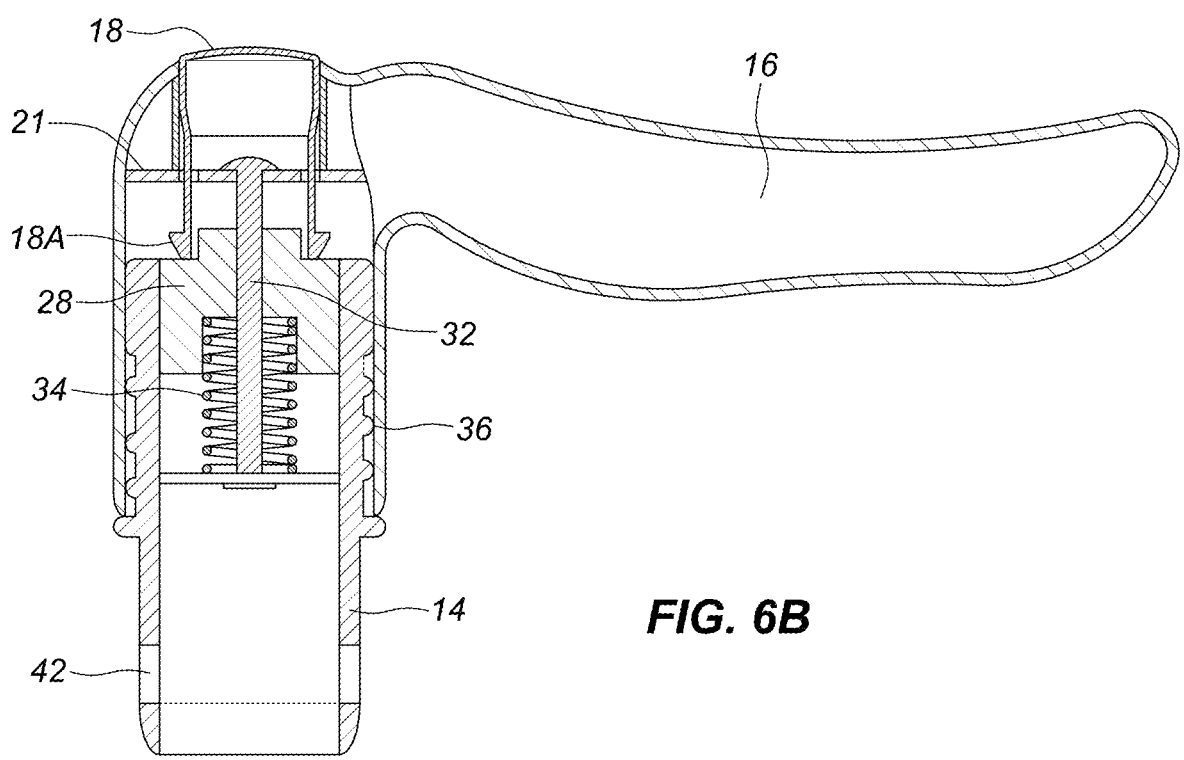
FIG. 6B is cross-sectional view of the handle assembly of FIG. 1 in a locked condition, according to an embodiment.
Figure 7A:
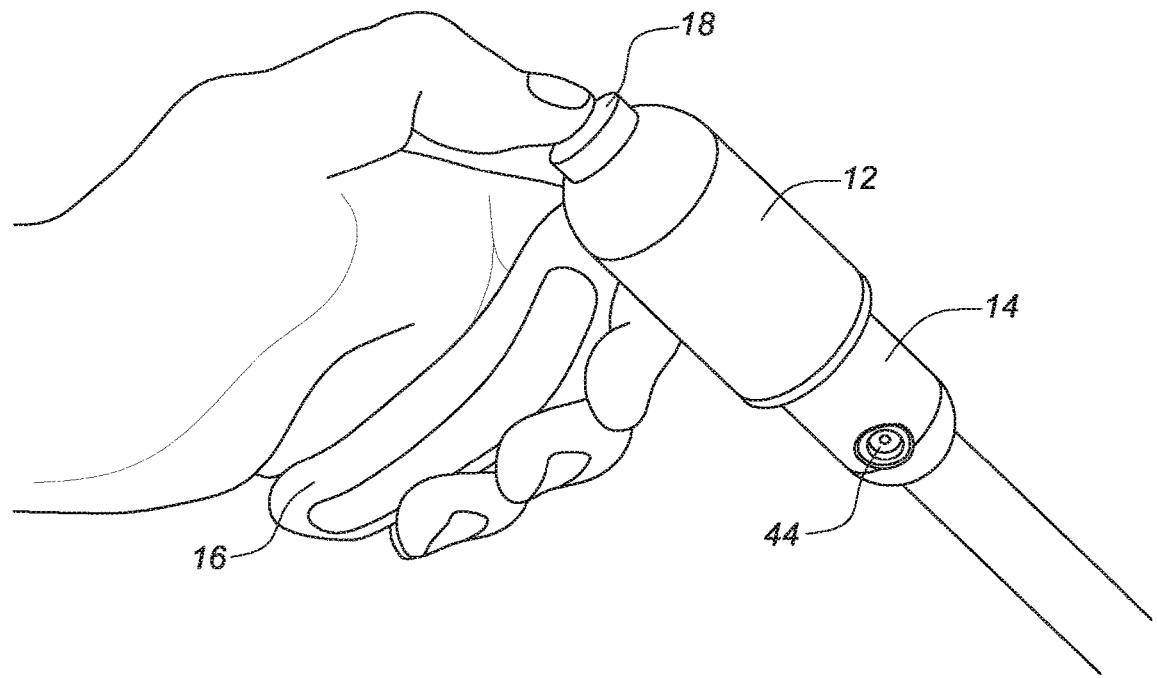
FIG. 7A is a perspective view of the handle assembly of FIG. 1 illustrating the pushing of a push button, according to an embodiment.
Figure 7B:
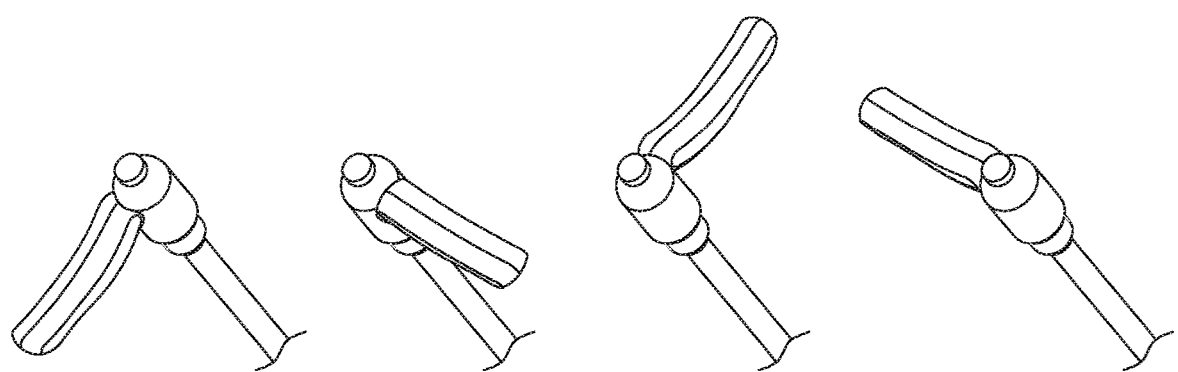
FIG. 7B is a perspective view of the handle assembly of FIG. 1 illustrating a rotation of the handle relative to a frame, according to an embodiment.

In some embodiments, the push button 18 defines a push-button axis 1A-1A. As shown in FIGS. 4 & 5, the push button 18 may include one or more push-button arms 18A and a button cap 18B. The pin 32 is aligned along the push-button axis 1A-1A to guide the spring-loaded gear 28 to move actuate along the 1A-1A axis.

In one embodiment, the base member 14 may include a base gear hub 40 with a plurality of base-member teeth 38 formed on a surface thereof and radially disposed about the push-button axis 1A-1A. The base gear hub 40 may be configured to receive the spring-loaded gear 28 and interlock the plurality of base-member teeth 38 with the plurality of gear teeth 30. The base member 14 may include one or more circular ribs 36 to guide the rotational movement of the handle 13 relative to the base member 14.

In one embodiment, the handle 13 may include an arm 16 extending substantially perpendicular to a handle shaft 12. The handle shaft 12 may include a first compartment 23 and a second compartment 25 separated by a retaining wall 21 with one or more apertures 22. The first compartment 23 and the second compartment 25 are aligned along the push-button axis 1A-1A. In one embodiment, the first compartment 23 may be adapted to slidably receive the button cap 18B as the one or more push-button arms 18A traverses through the at least one or more aperture 22 of the retaining wall 21.

In some embodiments, the second compartment 25 may include a handle gear hub 24 with a plurality of shaft teeth 26 formed on a surface thereof and radially disposed about the push-button axis 1A-1A. The handle gear hub 24 may be configured to receive the spring-loaded gear 28 and interlock the plurality of shaft teeth 26 with the plurality of gear teeth 30. The handle gear hub 24 may be positioned adjacent the retaining wall 21 and in a distal end of the handle shaft 12. The second compartment 25 may be adapted to rotatably receive the base member 14 at a proximate end of the handle shaft 12.

As can be appreciated, in a released position or condition, the handle assembly 10 may be configured to allow rotation of the handle 13 upon actuation of the push button 18, which moves the at least one push-button arm 18A through one of the one or more apertures 22 of the retaining wall 21, and in turn, slidably disengages the spring-loaded gear 28 from the handle gear hub 24 to allow the arm 16 to freely rotate along the push-button axis 1A-1A. Further, in the locked position, the handle assembly 10 may be configured to prevent rotation of the handle 13 upon release of the push button 18, which slidably interlocks the spring-loaded gear 28 to the handle gear hub 24.

Figure 8:
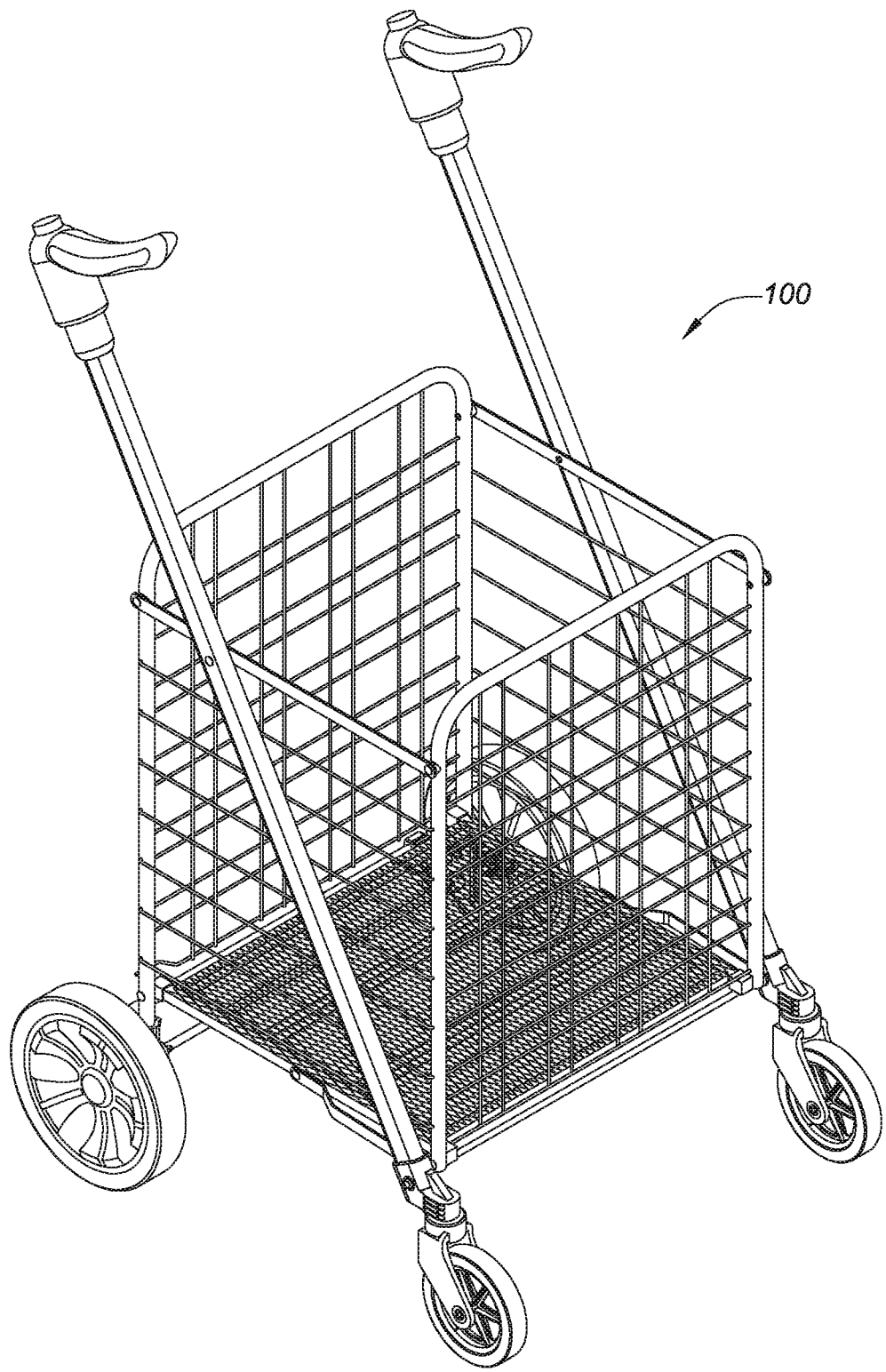
FIG. 8 is a perspective view of a collapsible cart with the handle assembly of FIG. 1, according to an embodiment.
Figure 9:
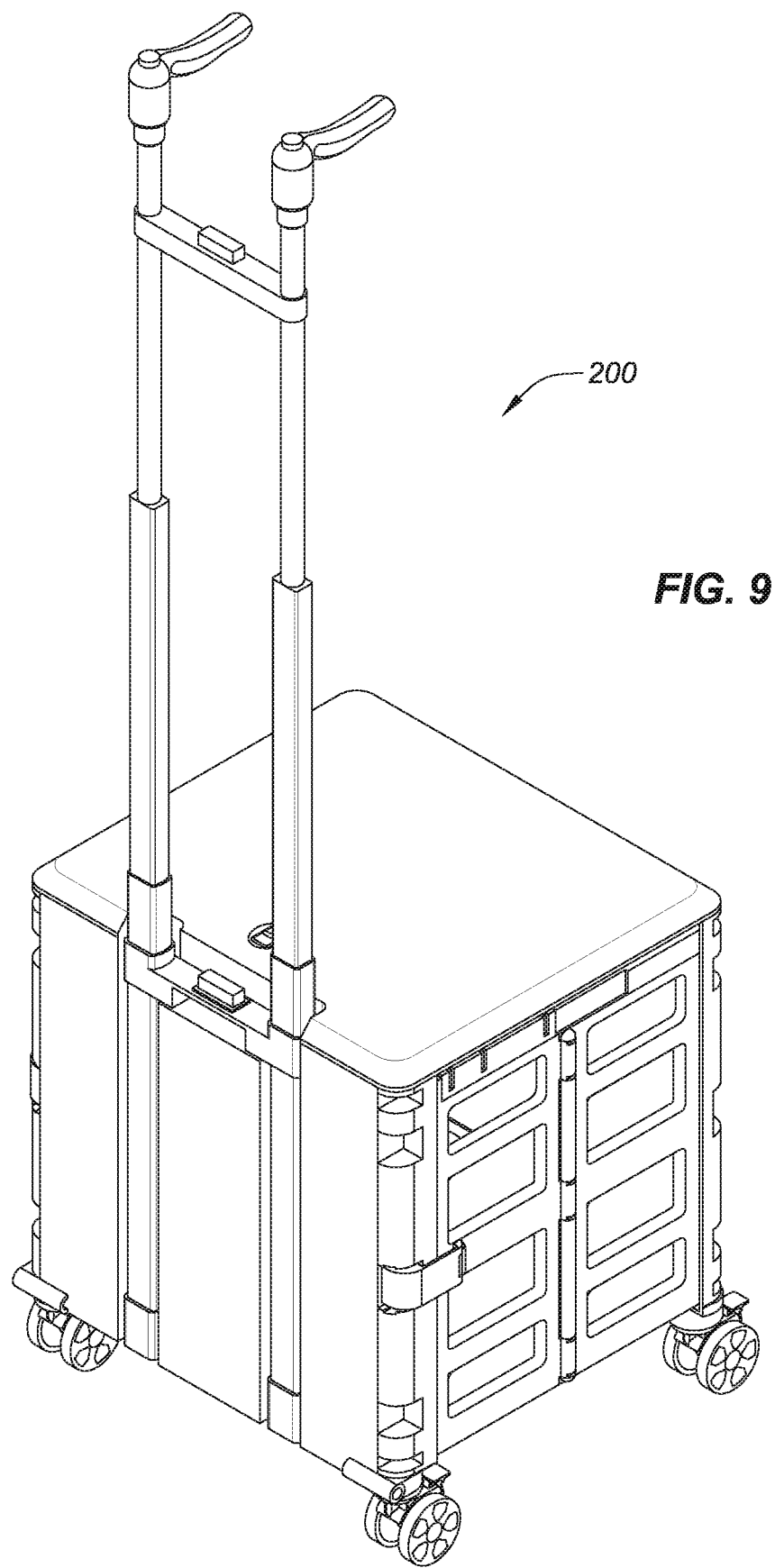
FIG. 9 is a perspective view of another collapsible cart with the handle assembly of FIG. 1, according to an embodiment.
Figure 10:
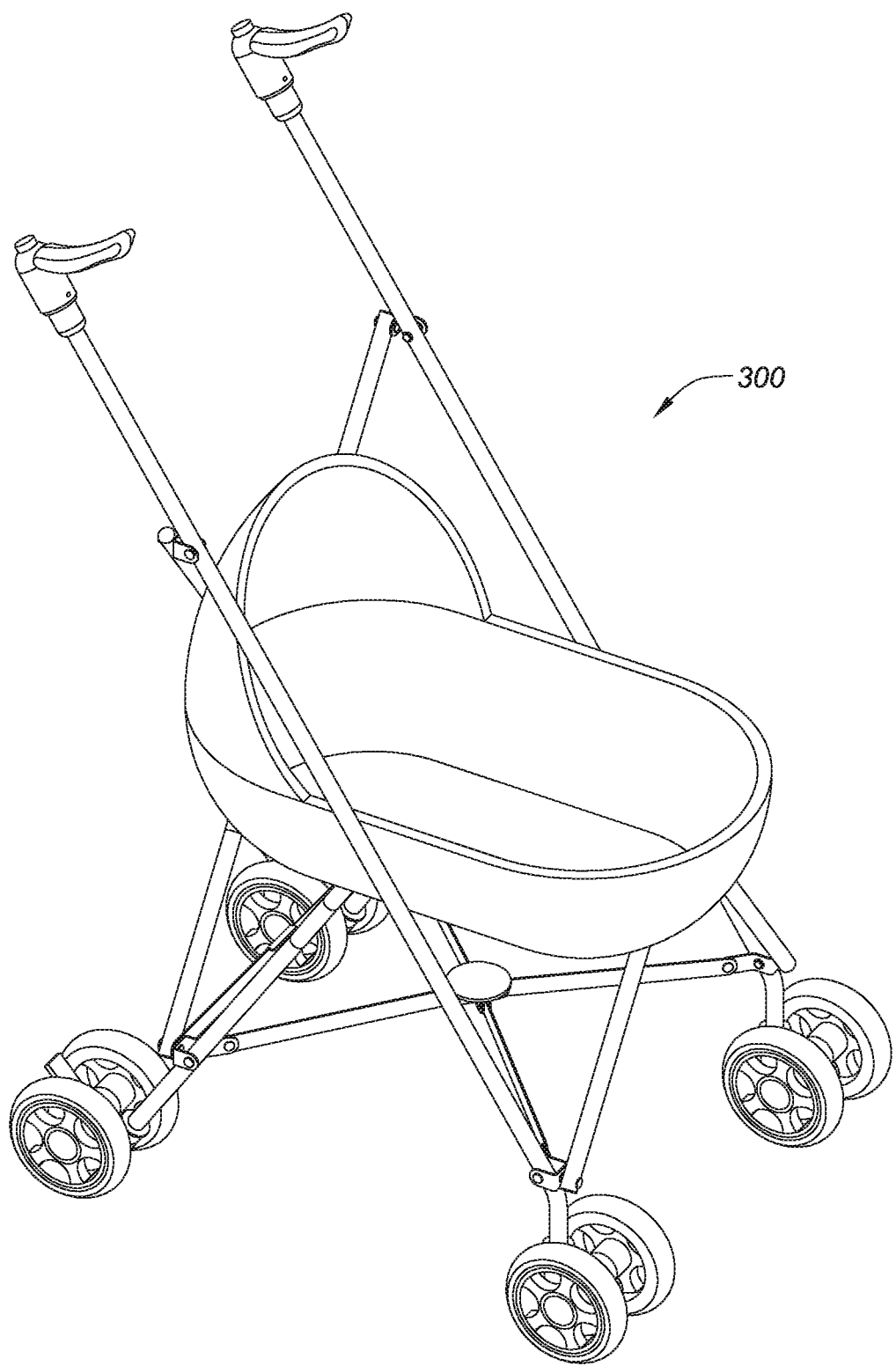
FIG. 10 is a perspective view of a baby stroller with the handle assembly of FIG. 1, according to an embodiment.
Figure 11:
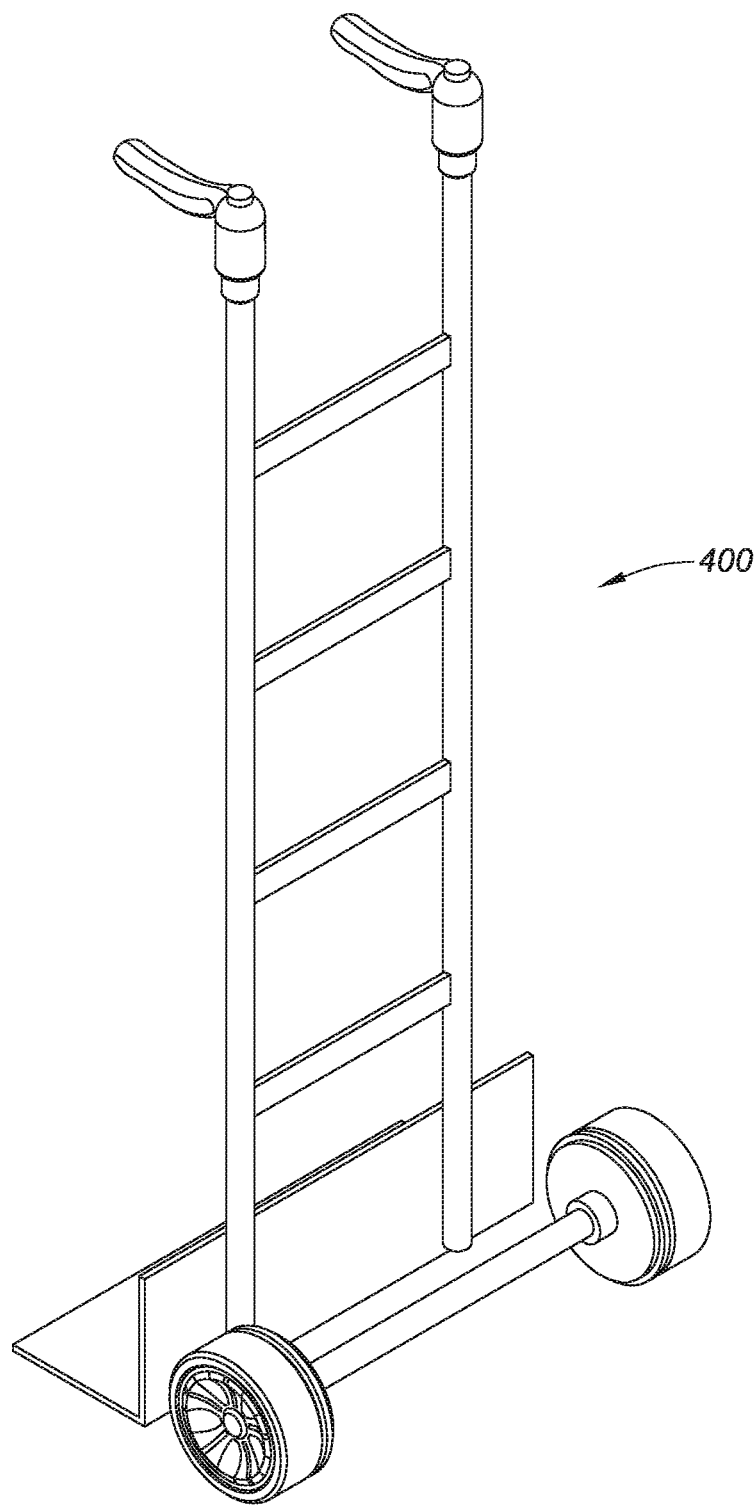
FIG. 11 is a perspective view of a hand truck with the handle assembly of FIG. 1, according to an embodiment.
Figure 12:
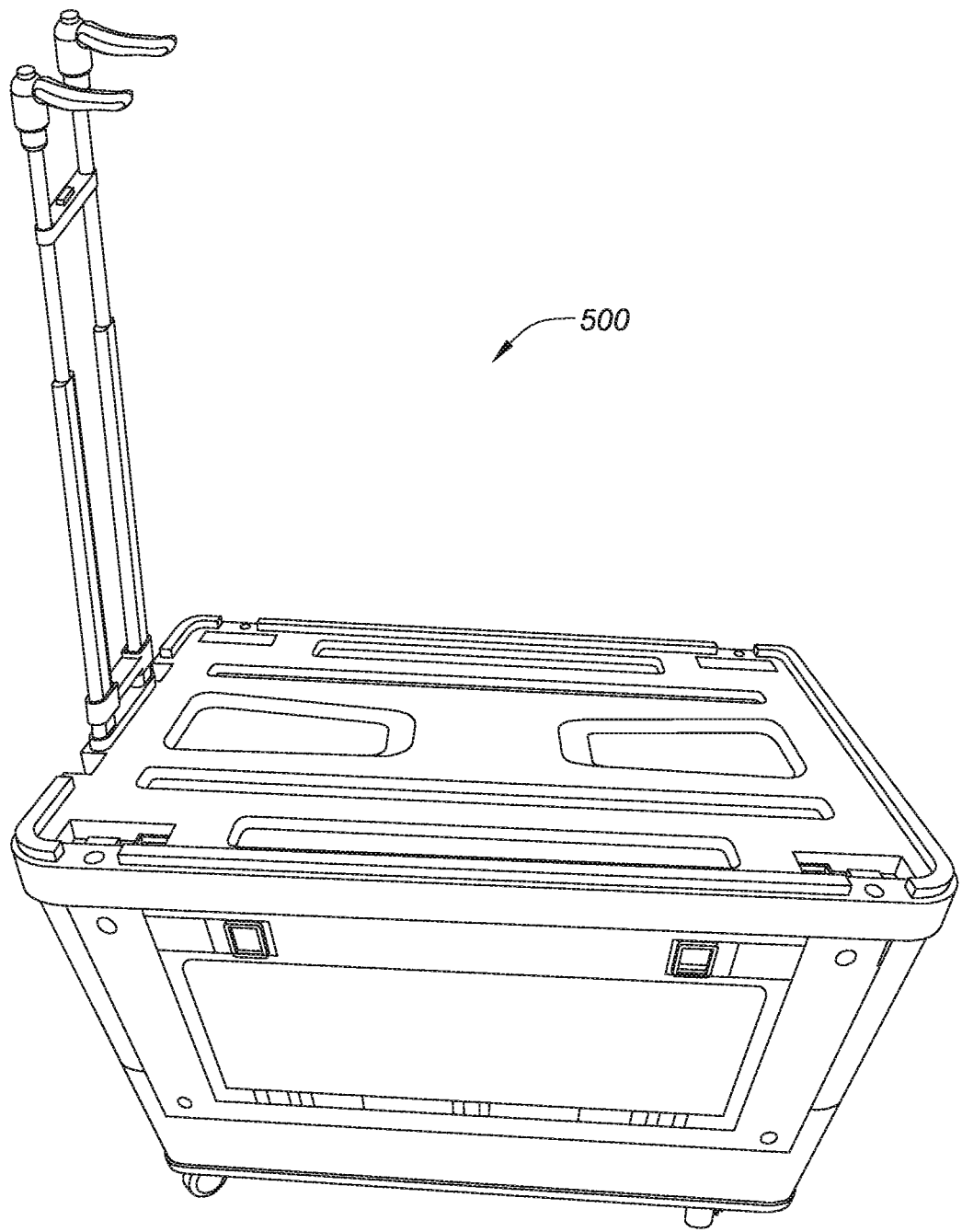
FIG. 12 is a perspective view of a collapsible cart with the handle assembly of FIG. 1, according to an embodiment.
Figure 13:
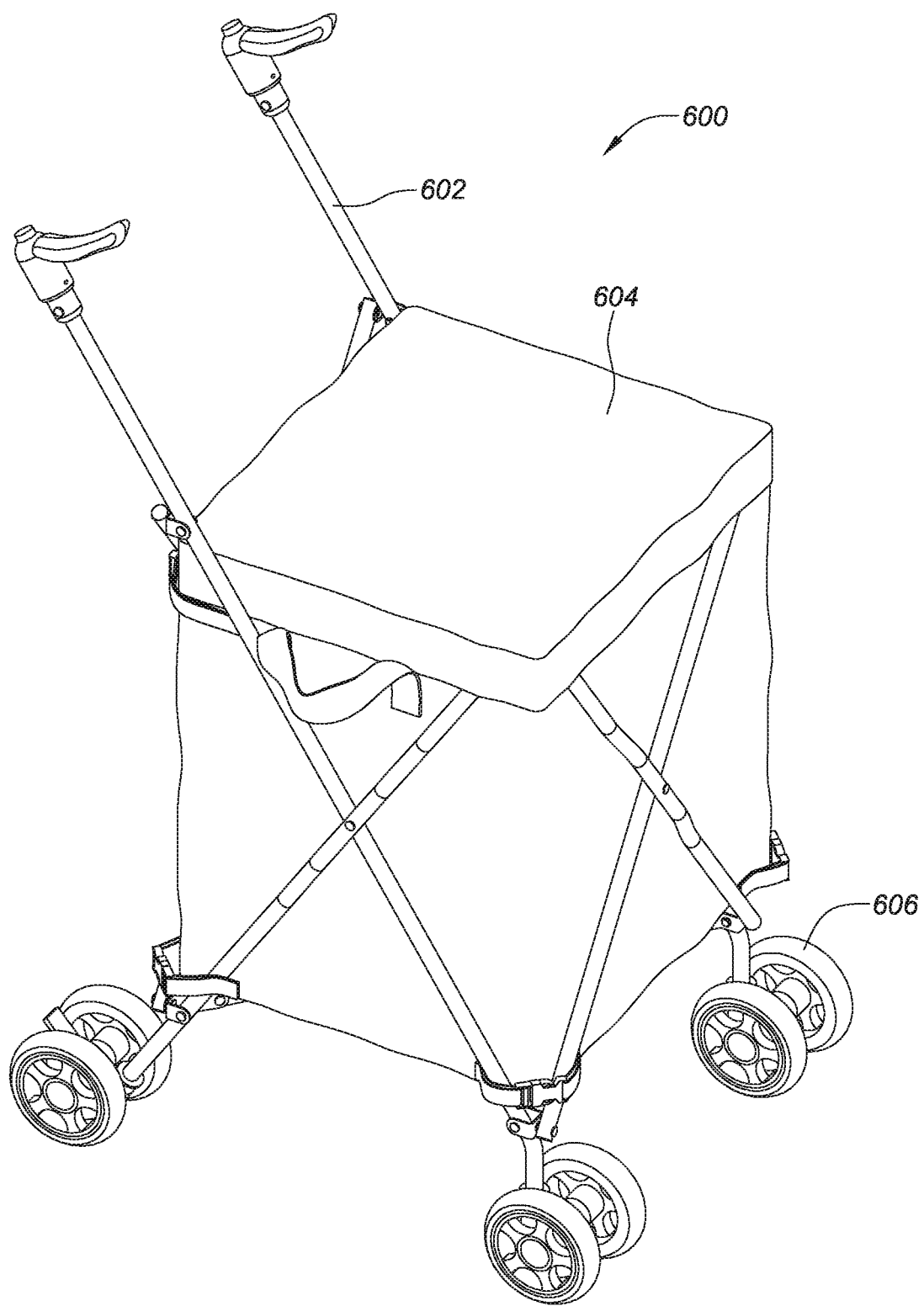
FIG. 13 a perspective view of a collapsible cart with the handle assembly of FIG. 1 and a flexible bag, according to an embodiment.
Figure 14A:
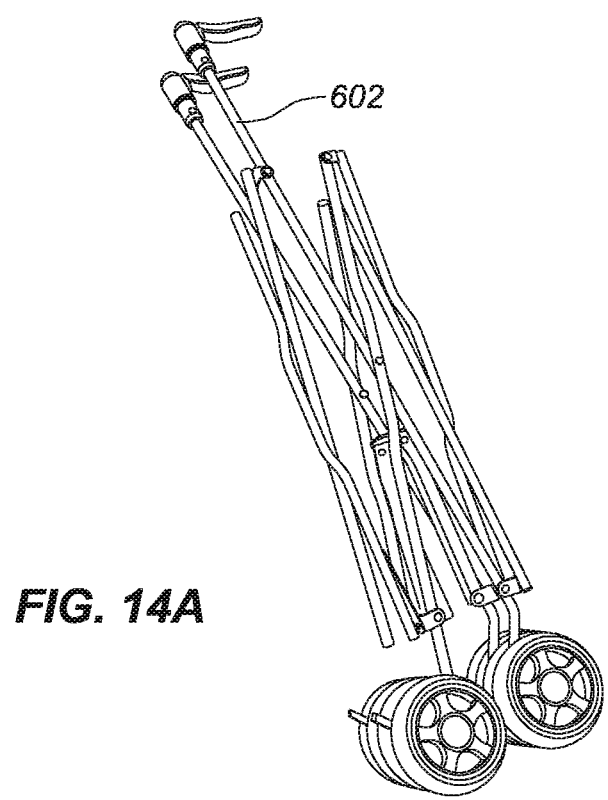
FIG. 14A is a perspective view of the collapsible cart of FIG. 13 illustrated in a closed condition without the flexible bag, according to an embodiment.
Figure 14B:
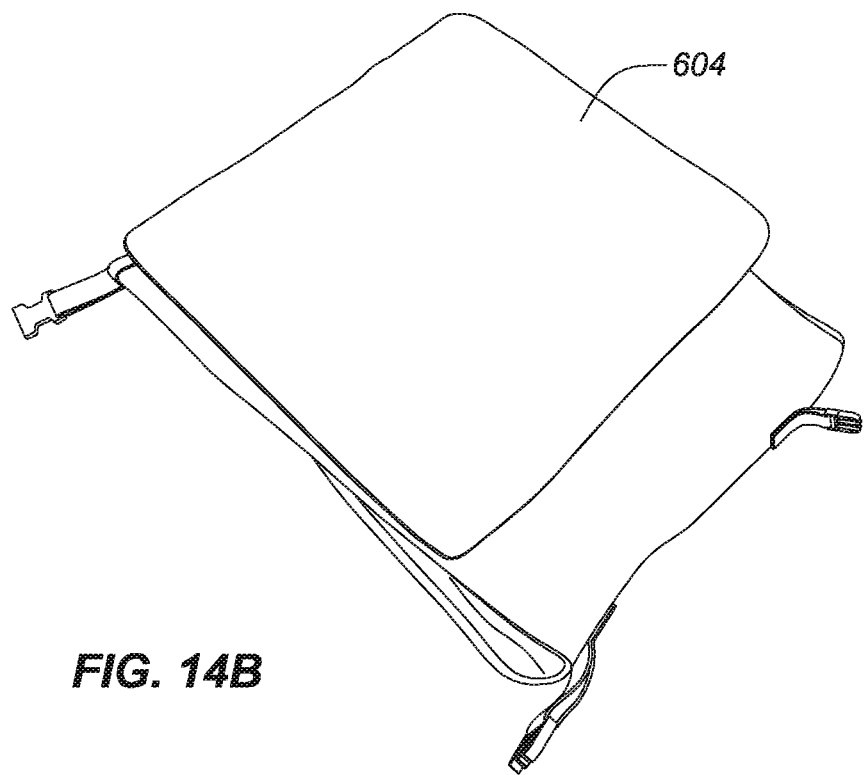
FIG. 14B is a perspective view of the flexible bag in a closed or folded condition, according to an embodiment.
Figure 14C:
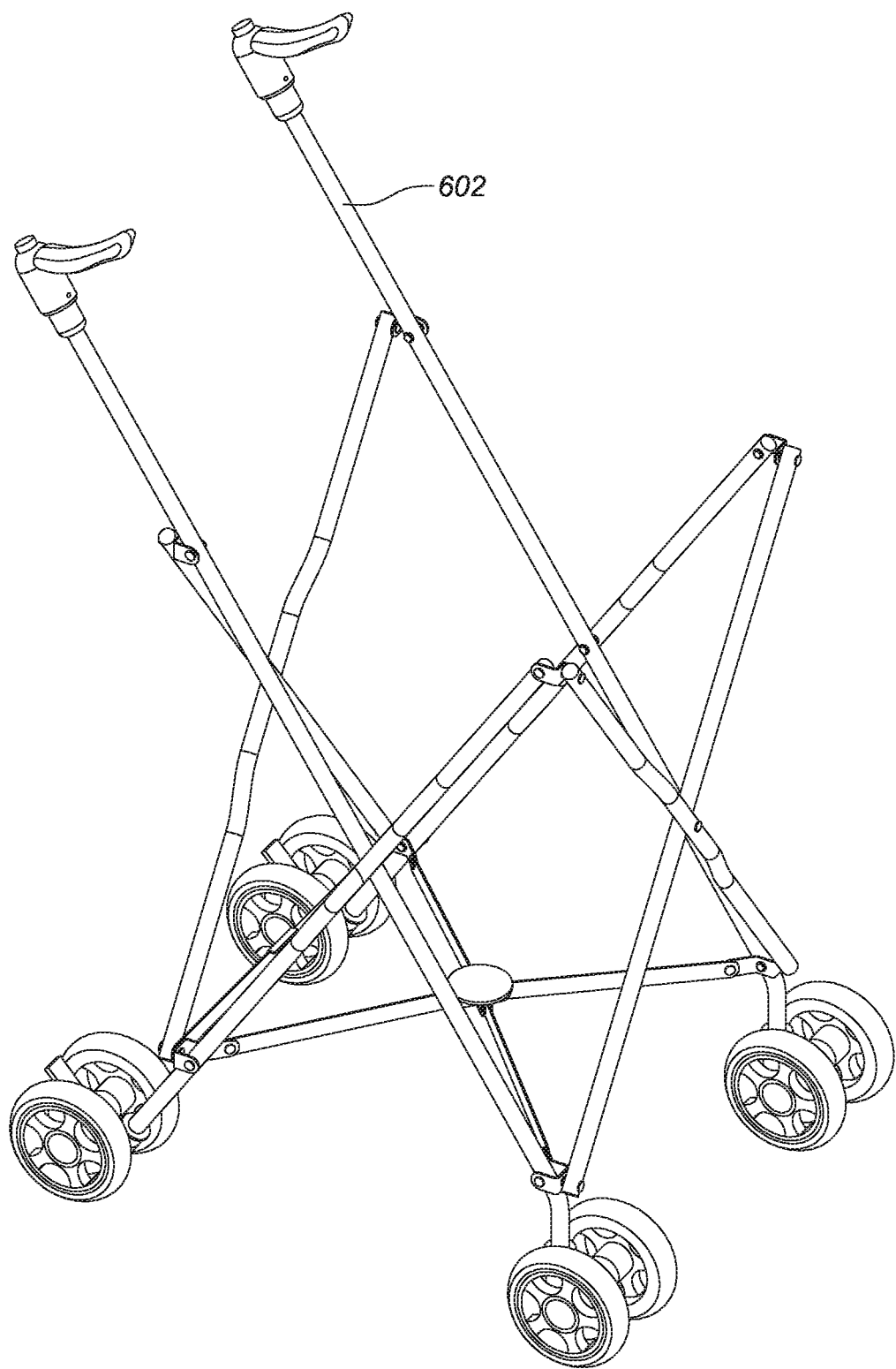
FIG. 14C is a perspective view of the collapsible cart of FIG. 13 illustrated in an open condition without the flexible bag, according to an embodiment.
Figure 14D:
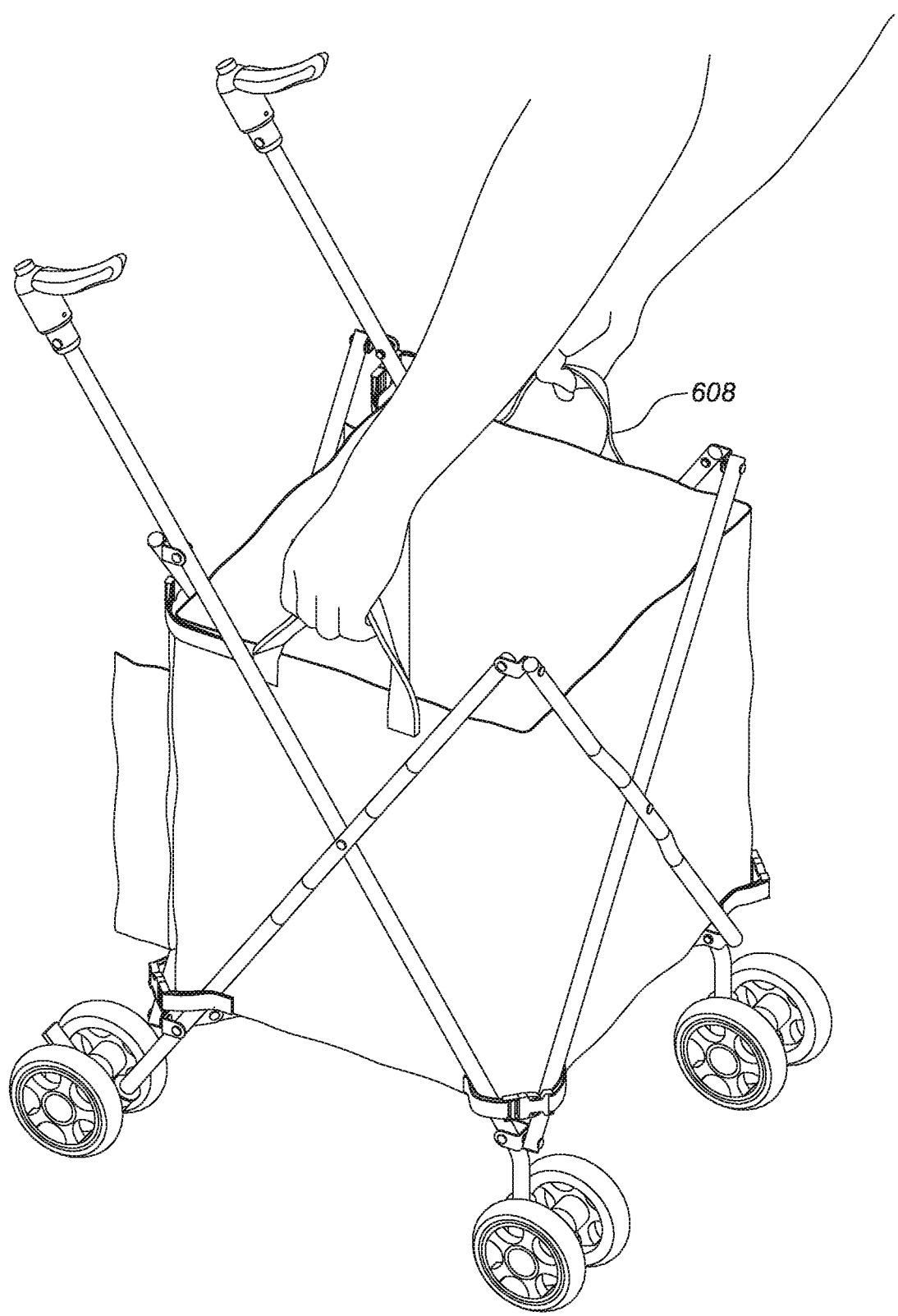
FIG. 14D is a perspective view of the collapsible cart of FIG. 13 illustrated with its top down and handles held by a user, according to an embodiment.
Figure 14E:
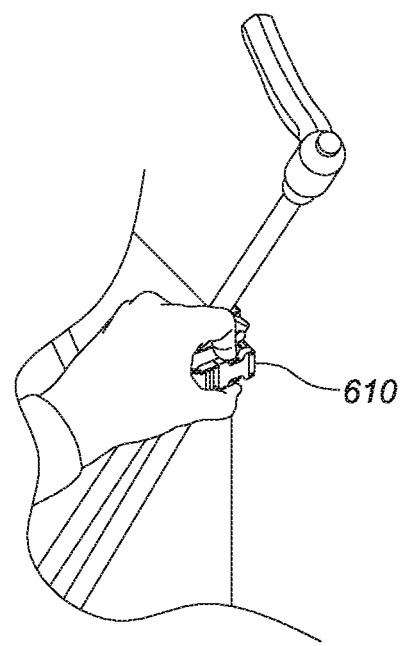
FIG. 14E is a perspective view of a top buckle coupling the flexible bag to the frame of the collapsible cart of FIG. 13, according to an embodiment.
Figure 14F:
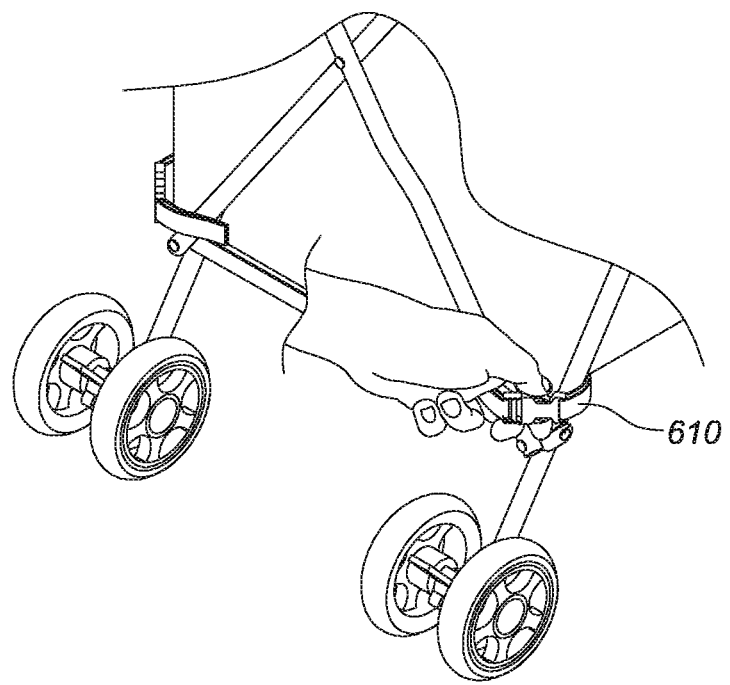
FIG. 14F is a perspective view of a bottom buckle coupling the flexible bag to the frame of the collapsible cart of FIG. 13, according to an embodiment.
Figure 15A:
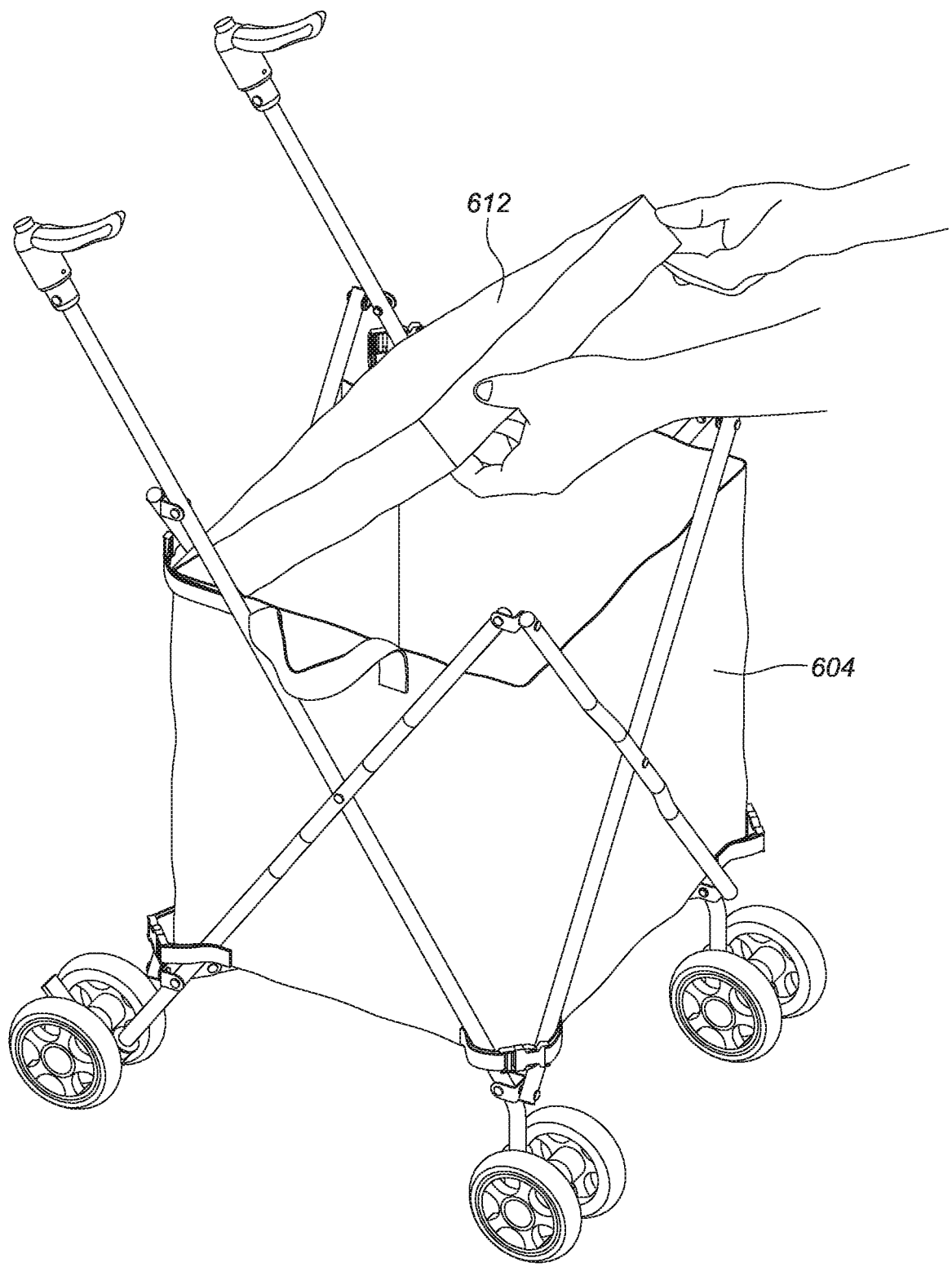
FIG. 15A is a perspective view of the collapsible cart of FIG. 13 illustrated with a user closing the openable top of the collapsible cart, according to an embodiment.
Figure 15B:
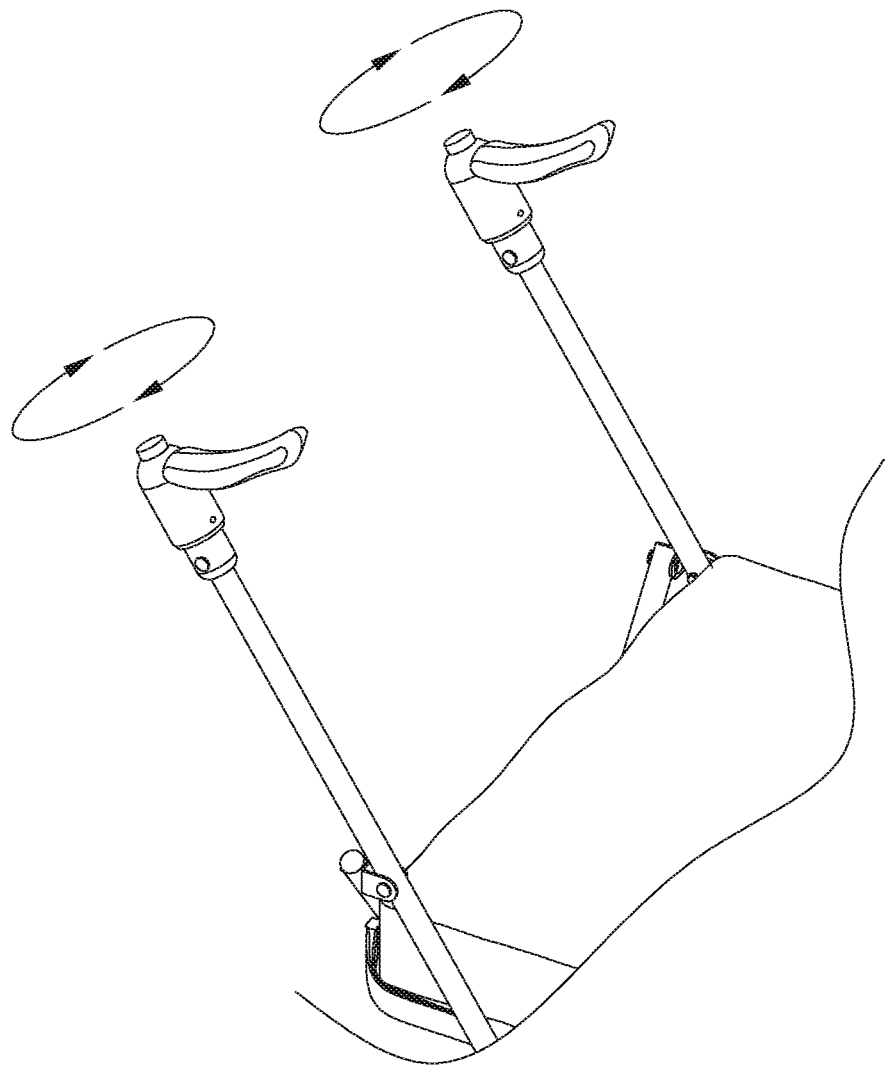
FIG. 15B is a perspective view of a portion of the collapsible cart of FIG. 13 illustrating a rotation of the handle relative to a frame, according to an embodiment.
Figure 16A:
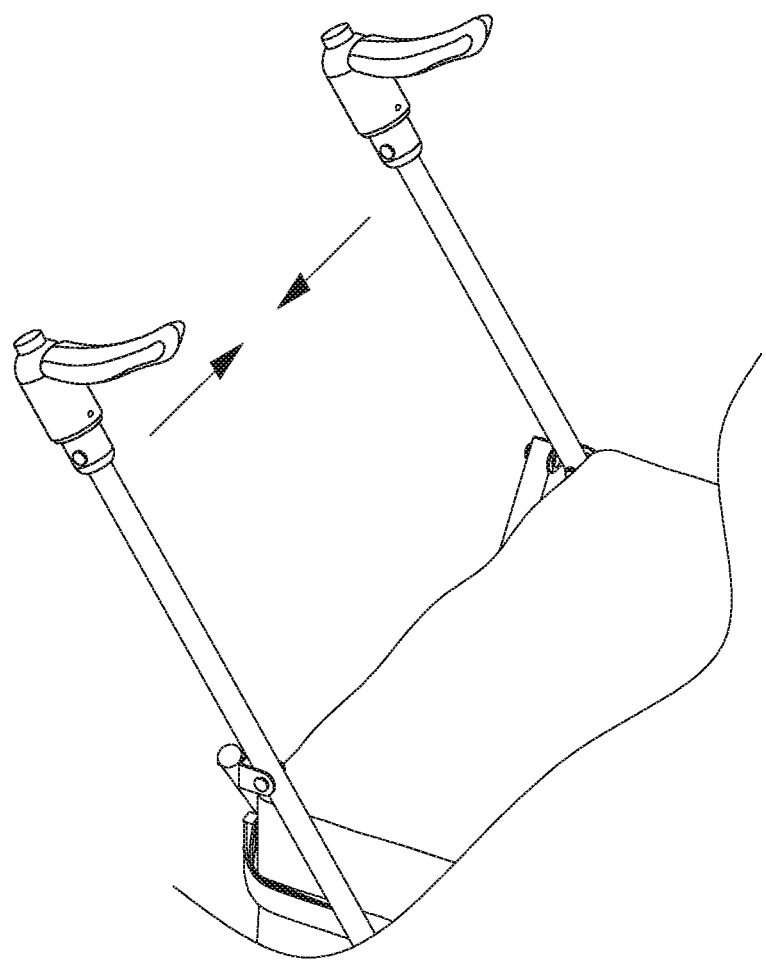
FIG. 16A is a perspective view of a portion of the collapsible cart of FIG. 13 illustrating the direction of movement of the frame of the collapsible cart from an open condition to a closed condition, according to an embodiment.
Figure 16B:
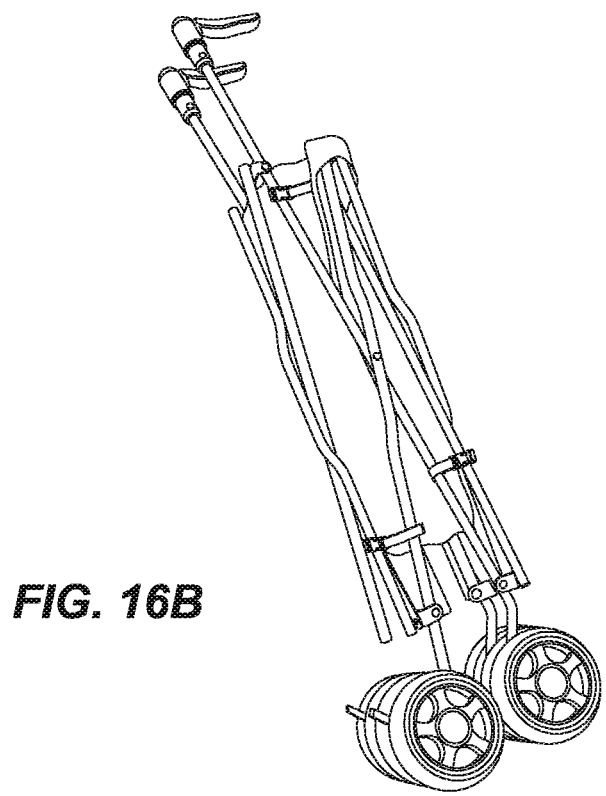
FIG. 16B is a perspective view of the collapsible cart of FIG. 13 illustrated in a closed condition with the flexible bag, according to an embodiment.
Figure 16C:
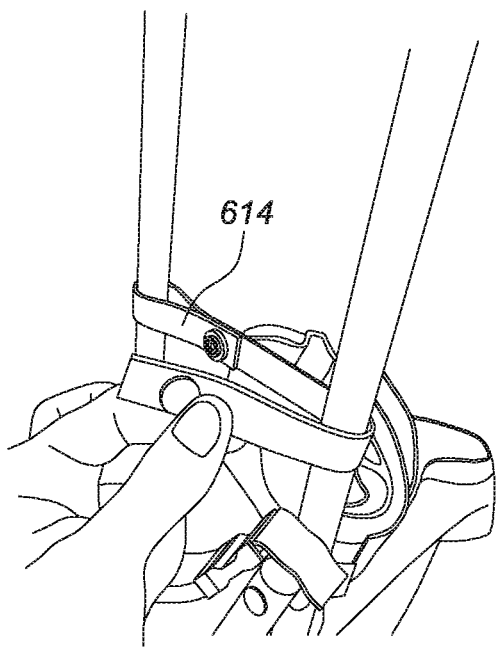
FIGS. 16C and 16D illustrate a fastener for retaining the collapsible cart of FIG. 16B in a closed condition, according to an embodiment.
Figure 16D:
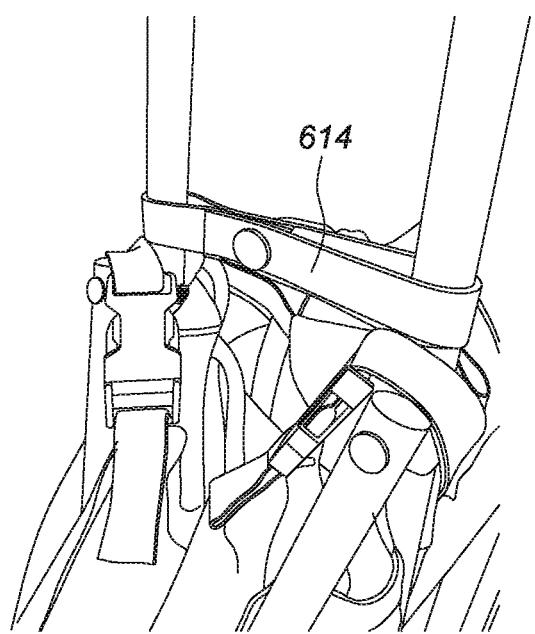

FIGS. 8-13 illustrate various exemplary rolling assemblies that incorporate the handle assembly, according to an embodiment of the present disclosure. As can be appreciated, these rolling assemblies include a frame and a plurality of wheel assemblies. In one embodiment, the handle assembly is coupled to the frame. FIG. 8 is a perspective view of a collapsible cart 100 with the handle assembly of FIG. 1, according to an embodiment. FIG. 9 is a perspective view of another collapsible cart 200 with the handle assembly of FIG. 1, according to an embodiment. FIG. 10 is a perspective view of a baby stroller 300 with the handle assembly of FIG. 1, according to an embodiment. The baby stroller 300 may include a child seat and/or bed assembly mounted on the frame. FIG. 11 is a perspective view of a hand truck 400 with the handle assembly of FIG. 1, according to an embodiment. FIG. 12 is a perspective view of a collapsible cart 500 with the handle assembly of FIG. 1, according to an embodiment. FIG. 13 a perspective view of a collapsible cart 600 with the handle assembly of FIG. 1 and a flexible bag, according to an embodiment.

In some embodiments, the rolling assembly may include a toe plate 410 coupled to a frame 420. In some embodiments, the toe plate 410 may be rotatably coupled to the frame 420. As can be appreciated, the toe plate 410 may be substantially aligned with an exterior surface of at least one wheel. In some embodiments, the rolling assembly has a frame forming a compartment with a front wall, a rear wall, a right sidewall, a left sidewall, and a bottom wall, the right sidewall and the left sidewall are configured to fold inwardly in a closed condition. In some embodiments, the rolling assembly may include a telescoping member. The telescoping member may include a proximate end and a distal end. The telescoping member coupled to the frame at the distal end and coupled to the handle assembly at the proximate end. In some embodiments, the frame may be configured to transition from a closed condition where it may be folded up to an open condition where it may be expanded for use. In an open condition, the frame may include an integrated lock assembly having a first condition for locking the frame in the open condition, and a second condition for unlocking the frame to allow folding for the closed condition. For example, the lock assembly may include a slideable or pivotable member cooperatively engaged to a first track, wherein the slideable or pivotable member is movable along the first track between an open position to a closed position to selectively lock a first frame member to a second frame member.

FIGS. 13-16 illustrate a collapsible cart 600 with the handle assembly of FIG. 1, according to an embodiment. The collapsible cart 600 may include a frame 602, a flexible bag 604, and a plurality of wheel assemblies 606. The flexible bag 604 may include four vertical walls and an openable top 612, which collectively form a chamber for placing objects. The flexible bag 602 may be removable for cleaning or replacement, ensuring user hygiene and convenience. The bottom wall of the flexible bag 604 may rest on a horizontal base section 609 of the frame 602. In one embodiment, the flexible bag 604 may include handles 608. As can be appreciated, the flexible bag 604 may include one or more buckles 610 to couple the flexible bag 604 to the frame 602. The flexible bag may also include a fastener 614 for retaining the collapsible cart 600 in a closed condition. The plurality of wheel assemblies 606 may include at least one brake assembly located at one of the rear wheels.

As can be appreciated, in one embodiment, a rolling assembly embodies a versatile and ergonomic design, offering improved convenience and functionality for transporting objects. The rolling assembly includes an innovative handle assembly, meticulously engineered to optimize user control and comfort during operation. The handle assembly allows for dynamic adjustment between released and locked positions.

Integrated into the handle assembly are intuitive controls and mechanisms that facilitate seamless operation. The push button, defining a push-button axis, includes one or more push button arms and a button cap, allowing users to initiate handle adjustments effortlessly for personalized comfort or securely lock it at a predetermined angle for stability during transportation. The spring-loaded gear of the handle assembly comprises a handle gear shaft and handle gear teeth. The spring-loaded gear transitions between released and locked positions via a spring mechanism, ensuring reliable locking and unlocking of the handle assembly with precision and efficiency.

Complementing the handle assembly is a robust frame structure designed for durability and versatility. The frame may include front, rear, right, and left sidewalls, forming a compartment for accommodating objects of various sizes. Additionally, the frame may feature a collapsible design, enabling it to transition between a compact closed condition for storage and an expanded open condition for use, enhancing portability and convenience in diverse environments.

The rolling assembly may further incorporate multiple wheel assemblies positioned for optimal stability and maneuverability. These wheel assemblies feature wheels designed to traverse various surfaces smoothly, ensuring effortless navigation even in challenging terrains. Select wheel assemblies may include brake mechanisms, providing users with additional control over the rolling assembly's movement when required, enhancing safety and ease of use.

In an alternative embodiment, the rolling assembly presents a sleek and compact design tailored for urban commuters and travelers seeking efficient and stylish transportation solutions. This embodiment comprises a handle assembly, featuring advanced materials and precision engineering to enhance user experience. The handle assembly includes a push button, a spring-loaded gear, a handle, and a base member. It incorporates additional ergonomic enhancements and intuitive controls to cater to the needs of urban commuters. The push button, ergonomically positioned for easy access, allows for seamless adjustment of the handle orientation, and ensuring optimal comfort during use.

Complementing the handle assembly is a streamlined frame structure crafted from lightweight yet durable materials, striking a balance between strength and portability. As can be appreciated, the frame may incorporate a minimalist design, featuring sleek lines and refined aesthetics, making it a stylish accessory for modern urban lifestyles.

Wheel assemblies may be engineered for urban environments, featuring high-performance wheels designed to navigate various floor surfaces with ease. Furthermore, select wheel assemblies may include retractable mechanisms for compact storage in crowded spaces, further enhancing the assembly's portability and convenience. Moreover, at least one of the wheel assemblies may include a brake assembly with a brake lever arm, providing additional control over the rolling assembly's movement when necessary. This embodiment ensures both mobility and stability, catering to diverse transportation needs.

Furthermore, the handle assembly's design enables integration with additional features such as a telescoping member, which extends from the frame to the handle assembly. This telescoping member enhances user interaction by facilitating comfortable grip and maneuvering of the rolling assembly. Moreover, the handle assembly's adaptability extends to accommodating accessories such as child seat or bed assemblies, offering versatility in application.

Whether used as a collapsible cart, baby stroller, hand truck, or with a flexible bag attachment, the rolling assemblies of the present disclosure offer unparalleled versatility and performance, enhancing user experience and convenience in transporting objects.

Although the various inventive aspects are herein disclosed in the context of certain preferred embodiments, implementations, and examples, it will be understood by those skilled in the art that the present invention extends beyond the specifically disclosed embodiments to other alternative embodiments and/or uses of the invention and obvious modifications and equivalents thereof. In addition, while a number of variations of the inventive aspects have been shown and described in detail, other modifications, which are within their scope will be readily apparent to those of skill in the art based upon this disclosure. It should be also understood that the scope this disclosure includes the various combinations or sub-combinations of the specific features and aspects of the embodiments disclosed herein, such that the various features, modes of implementation, and aspects of the disclosed subject matter may be combined with or substituted for one another. Thus, it is intended that the scope of the present invention herein disclosed should not be limited by the particular disclosed embodiments or implementations described above, but should be determined only by a fair reading of the claims.

Similarly, this disclosure is not to be interpreted as reflecting an intention that any claim requires more features than are expressly recited in that claim. Rather, as the following claims reflect, inventive aspects lie in a combination of fewer than all features of any single foregoing disclosed embodiment. Thus, the claims following the Detailed Description are hereby expressly incorporated into this Detailed Description, with each claim standing on its own as a separate embodiment.

Further, all claim terms should be interpreted in their most expansive forms so as to afford the applicant the broadest coverage legally permissible. Although the embodiments have been described with reference to the drawings and specific examples, it will readily be appreciated by those skilled in the art that many modifications and adaptations of the processes, methods and apparatuses described herein are possible without departure from the spirit and scope of the embodiments as claimed herein. Thus, it is to be clearly understood that this description is made only by way of example and not as a limitation on the scope of the embodiments as claimed below.

What is claimed is:

1. A rolling assembly comprising:
   a frame configured to transport one or more objects;
   a plurality of wheel assemblies rotatably coupled to the frame, each of the plurality of wheel assemblies comprising a wheel; and
   a handle assembly comprising a push button, a spring-loaded gear, a handle, and a base member,
      the push button defining a push-button axis and comprising at least one push-button arm,
      the spring-loaded gear comprising a gear shaft and a plurality of gear teeth, the spring-loaded gear is adapted to actuate between a released position and a locked position,
      the handle comprising an arm extending substantially perpendicular to a handle shaft, the handle shaft having a first compartment and a second compartment separated by a retaining wall with one or more apertures, the first compartment and the second compartment are aligned along the push-button axis, the first compartment is adapted to slidably receive the push button,
      the second compartment comprising a gear hub with a plurality of shaft teeth formed on a surface thereof and radially disposed about the push-button axis, the gear hub is configured to receive the spring-loaded gear and interlock the plurality of shaft teeth with the plurality of gear teeth, the gear hub is positioned adjacent the retaining wall and in a distal end of the handle shaft, the second compartment is adapted to rotatably receive the base member at the proximate end of the handle shaft, the base member coupled to the frame and comprising a base gear hub with a plurality of base-member teeth formed on a surface thereof and radially disposed about the push-button axis, the base gear hub is configured to receive the spring-loaded gear and interlock the plurality of base-member teeth with the plurality of gear teeth, wherein, in the released position, the handle assembly is configured to allow rotation of the handle upon actuation of the push button, which moves the at least one push-button arm through one of the one or more apertures of the retaining wall, and in turn, slidably disengages the spring-loaded gear from the gear hub to allow the arm to freely rotate along the push-button axis; and wherein, in the locked position, the handle assembly is configured to prevent rotation of the handle upon release of the push button, which slidably interlocks the spring-loaded gear to the gear hub.

2. The rolling assembly of claim 1, further comprising a child seat or bed assembly mounted to the frame.

3. The rolling assembly of claim 1, further comprising a toe plate coupled to the frame.

4. The rolling assembly of claim 3, wherein the toe plate is rotatably coupled to the frame, the toe plate substantially aligned with an exterior surface of at least one wheel.

5. The rolling assembly of claim 1, wherein the frame forms a compartment having a front wall, a rear wall, a right sidewall, a left sidewall, and a bottom wall, the right sidewall and the left sidewall are configured to fold inwardly in a closed condition.

6. The rolling assembly of claim 1, further comprising a telescoping member having a proximate end and a distal end, the telescoping member coupled to the frame at the distal end and coupled to the handle assembly at the proximate end.

7. The rolling assembly of claim 1, further comprising a flexible bag having four vertical walls and an openable top, which collectively form a chamber for placing objects, wherein the bottom wall of the flexible bag rests on a horizontal base section of the frame.

8. The rolling assembly of claim 1, wherein the frame is configured to transition from a closed condition where it is folded up to an open condition where it is expanded for use.

9. A rolling assembly configured to transition from a closed condition where it is folded up to an open condition where it is expanded for use, the rolling assembly comprising:

a frame configured to transport one or more objects and forming a compartment having a front wall, a rear wall, a right sidewall, a left sidewall, and a bottom wall;

a plurality of wheel assemblies rotatably coupled to the frame, each of the plurality of wheel assemblies comprising a wheel; and a handle assembly comprising a push button, a spring-loaded gear, a handle, and a base member, the push button defining a push-button axis and comprising a button cap and at least one push-button arm, the at least one push-button arm is located beneath the button cap and configured to actuate the spring-loaded gear, the spring-loaded gear comprising a gear shaft and a plurality of gear teeth, the spring-loaded gear is adapted to actuate between a released condition and a locked condition, the handle comprising an arm extending substantially perpendicular to a handle shaft, the handle shaft having a first compartment and a second compartment separated by a housing wall with one or more apertures, the first compartment and the second compartment are aligned along the push-button axis, the first compartment is adapted to slidably receive the button cap as the at least one push-button arm traverses through the at least one or more aperture of the housing wall, the second compartment having a proximate end and a distal end, the second compartment comprising a handle gear hub at the distal end with a plurality of shaft teeth formed on a surface thereof and radially disposed about the push-button axis, the handle gear hub is configured to receive the spring-loaded gear and removably engage the plurality of shaft teeth with the plurality of gear teeth, the second compartment is adapted to rotatably receive the base member at the proximate end of the second compartment, the base member coupled to the frame and comprising a base gear hub with a plurality of base-member teeth formed on a surface thereof and radially disposed about the push-button axis, the base gear hub is substantially the same dimensions as the handle gear hub and is configured to receive the spring-loaded gear and removably engage the plurality of base-member teeth with the plurality of gear teeth.

10. The rolling assembly of claim 9, wherein, in the released condition, the handle assembly is configured to allow rotation of the handle upon actuation of the push button, which moves the at least one push-button arm through one of the one or more apertures of the housing wall, and in turn, slidably moves the spring-loaded gear to the base gear hub to allow the arm to freely rotate along the push-button axis, and wherein, in the locked condition, the handle assembly is configured to prevent rotation of the handle upon release of the push button, which slidably moves the spring-loaded gear to a predetermined position where a first section of the gear teeth at its distal end interlocks with the shaft teeth of the handle gear hub and a second section of the gear teeth at its proximate end interlocks with the base-member teeth of the base gear hub.

11. The rolling assembly of claim 9, further comprising a telescoping member having a proximate end and a distal end, the telescoping member coupled to the frame at the distal end and coupled to the handle assembly at the proximate end.

12. The rolling assembly of claim 9, wherein at least one of the plurality of wheel assemblies comprises a brake assembly with a brake lever arm.

13. The rolling assembly of claim 9, wherein the right sidewall and the left sidewall are configured to fold inwardly in the closed condition, the right sidewall comprising a first right panel rotatably coupled to a second right panel, and the left sidewall comprising a first left panel rotatably coupled to a second left panel.

14. The rolling assembly of claim 9, further comprising:
a first track formed along the first right panel and the second right panel extending from a first position on the first right panel to a second position on the second right panel; and
a first slideable member cooperatively engaged to the first track, the first slideable member is movable along the first track between an open position to a closed position to selectively lock the first right panel to the second right panel.

15. A rolling assembly comprising:
a frame comprising a frame bottom wall and configured to transport one or more objects;
a plurality of wheel assemblies rotatably coupled to the frame, each of the plurality of wheel assemblies comprising a wheel;
a handle assembly comprising a push button, a spring-loaded gear, a handle, and a base member,
the push button defining a push-button axis and comprising a button cap and at least one push-button arm, the at least one push-button arm is located beneath the button cap and configured to actuate the spring-loaded gear,
the spring-loaded gear comprising a gear shaft and a plurality of gear teeth, the spring-loaded gear is adapted to actuate between a released position and a locked position,
the handle comprising an arm extending substantially perpendicular to a handle shaft, the handle shaft having a first compartment and a second compartment separated by a housing wall with one or more apertures, the first compartment and the second compartment are aligned along the push-button axis, the first compartment is adapted to slidably receive the button cap button as the at least one push-button arm traverses through the at least one or more apertures of the housing wall,
the second compartment having a proximate end and a distal end, the second compartment comprising a handle gear hub at the distal end with a plurality of shaft teeth formed on a surface thereof and radially disposed about the push-button axis, the handle gear hub is configured to receive the spring-loaded gear and removably engage the plurality of shaft teeth with the plurality of gear teeth, the second compartment is adapted to rotatably receive the base member at the proximate end of the second compartment,
the base member coupled to the frame and comprising a base gear hub with a plurality of base-member teeth formed on a surface thereof and radially disposed about the push-button axis, the base gear hub is substantially the same dimensions as the handle gear hub and is configured to receive the spring-loaded gear and removably engage the plurality of base-member teeth with the plurality of gear teeth,
wherein, in the released position, the handle assembly is configured to allow rotation of the handle upon actuation of the push button, which moves the at least one push-button arm through one of the one or more apertures of the housing wall, and in turn, slidably moves the spring-loaded gear to the base gear hub to allow the arm to freely rotate along the push-button axis, and
wherein, in the locked position, the handle assembly is configured to prevent rotation of the handle upon release of the push button, which slidably moves the spring-loaded gear to a predetermined position where a first section of the gear teeth at its distal end interlocks with the shaft teeth of the handle gear hub and a second section of the gear teeth at its proximate end interlocks with the base-member teeth of the base gear hub.

16. The rolling assembly of claim 15, further comprising a child seat or bed assembly mounted to the frame bottom wall of the frame.

17. The rolling assembly of claim 15, wherein the frame forms a compartment having a front wall, a rear wall, a right sidewall, a left sidewall, and the frame bottom wall, the right sidewall and the left sidewall are configured to fold inwardly in a closed condition.

18. The rolling assembly of claim 15, further comprising a telescoping member having a proximate end and a distal end, the telescoping member coupled to the frame at the distal end and coupled to the handle assembly at the proximate end.

19. The rolling assembly of claim 15, further comprising a flexible bag having four vertical walls, a bottom wall, and an openable top, which collectively form a chamber for placing objects, wherein the bottom wall of the flexible bag rests on a frame bottom wall of the frame.

20. The rolling assembly of claim 19, wherein the flexible bag comprises one or more buckles to couple the flexible bag to the frame.

* * * * *